US009786950B2

(12) United States Patent
Lee et al.

(10) Patent No.: US 9,786,950 B2
(45) Date of Patent: Oct. 10, 2017

(54) ORGANIC-INORGANIC SILICON STRUCTURE-CONTAINING BLOCK COPOLYMER, ELECTROLYTE INCLUDING THE SAME, AND LITHIUM BATTERY INCLUDING THE ELECTROLYTE

(71) Applicant: Samsung Electronics Co., Ltd., Suwon-si, Gyeonggi-do (KR)

(72) Inventors: Yonggun Lee, Incheon (KR); Yooseong Yang, Yongin-si (KR); Jenam Lee, Incheon (KR); Wonseok Chang, Seoul (KR); Hongsoo Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 322 days.

(21) Appl. No.: 14/624,968

(22) Filed: Feb. 18, 2015

(65) Prior Publication Data
US 2016/0072148 A1 Mar. 10, 2016

(30) Foreign Application Priority Data
Sep. 5, 2014 (KR) .................. 10-2014-0119373

(51) Int. Cl.
*C08G 77/442* (2006.01)
*H01M 10/0565* (2010.01)
*C08L 65/00* (2006.01)
*H01B 1/12* (2006.01)
*H01M 2/16* (2006.01)
*C08F 230/08* (2006.01)

(52) U.S. Cl.
CPC ......... *H01M 10/0565* (2013.01); *C08L 65/00* (2013.01); *H01B 1/122* (2013.01); *C08F 230/08* (2013.01); *C08G 77/442* (2013.01); *C08G 2261/144* (2013.01); *C08G 2261/18* (2013.01); *C08G 2261/312* (2013.01); *C08G 2261/512* (2013.01); *H01M 2/1673* (2013.01); *H01M 2300/0082* (2013.01); *H01M 2300/0085* (2013.01); *H01M 2300/0094* (2013.01)

(58) Field of Classification Search
CPC ...... C08G 77/42; C08G 77/46; C08G 77/442; H01M 10/0565; H01M 2300/0065; H01M 2300/0082; H01M 2300/0085
See application file for complete search history.

(56) References Cited

U.S. PATENT DOCUMENTS

| | | | | | |
|---|---|---|---|---|---|
| 5,387,479 | A | * | 2/1995 | Koksbang | H01M 4/13 427/122 |
| 2007/0082261 | A1 | * | 4/2007 | Lee | H01M 2/145 429/144 |
| 2008/0226977 | A1 | * | 9/2008 | Kim | H01M 10/0525 429/163 |
| 2009/0104523 | A1 | * | 4/2009 | Mullin | C08F 297/02 429/188 |
| 2012/0189912 | A1 | * | 7/2012 | Honda | H01M 4/667 429/211 |
| 2012/0312695 | A1 | | 12/2012 | Bose | |

FOREIGN PATENT DOCUMENTS

| | | | |
|---|---|---|---|
| JP | 2001-247741 A | | 9/2001 |
| KR | 10-0813242 B1 | | 3/2008 |
| KR | 10-1028970 B1 | | 4/2011 |
| KR | 10-1247596 B1 | | 4/2013 |
| KR | 10-1389732 B1 | | 4/2014 |
| WO | WO 2011/146669 | * | 11/2011 |
| WO | WO 2012/050407 | * | 4/2012 |
| WO | 2013/169370 A1 | | 11/2013 |

OTHER PUBLICATIONS

Kim, S-J., Kim, D-G., Lee, A., Sohn, H-S., Wie J.J., Nguyen, N.A., Mackay, M.E., Lee, J-C.—Organic/Inorganic Hybrid Block Copolymer Electrolytes with Nanoscale Ion-Conducting Channels for Lithium Batteries, Marcomolecules, 2012, 45, pp. 9347-9356.*
Goseki, E, Hirai, T., Ishida, Y., Kakimoto, M., Hayakawa, T.—Rapid and reversible morphology control in thin films of poly(ethyleneoxide)-block-POSS-containing poly(methacrylate), Polymer Journal, 2012, 44, pp. 658-644.*
Tan, R.H., Hussain, H., He, C.B.—Tailoring Micelle Formation and Gelation in (PEG-P(MA-POSS)) Amphiphilic Hybrid Block Copolymers, Macromolecules, 2011, 44, pp. 622-631.*
Hanjun Zhang, et al.; Blends of POSS-PEO(n=4)8 and High Molecular Weight Poly(ethylene oxide) as Solid Polymer Electrolytes for Lithium Batteries; J. Phys. Chem. B, 2007, 111, 3583-3590.
Yun Young Lee, et al.; Solid polymer electrolytes based on crosslinkable polyoctahedral silsesquioxanes (POSS) for room temperature lithium polymer batteries; J Solid State Electrochem 2010), 14, pp. 1445-1449.
Hanjun Zhang et al. "Blends of POSS-PEO(n=4)8 and High Molecular Weight Poly(ethylene oxide) as Solid Polymer Electrolytes for Lithium Batteries", J. Phys. Chem. B 2007, 111, 3583-3590.

(Continued)

*Primary Examiner* — Anca Eoff
(74) *Attorney, Agent, or Firm* — Cantor Colburn LLP

(57) ABSTRACT

An organic-inorganic silicon structure-containing block copolymer including a first domain including an ion conductive polymer block; and a second domain including a polymer block including a non-conducting polymer and an organic-inorganic silicon structure, wherein the organic-inorganic silicon structure is connected to a side chain connected to a backbone of the non-conducting polymer.

14 Claims, 9 Drawing Sheets

(56) References Cited

OTHER PUBLICATIONS

Liang Zhang et al., "Synthesis, Characterization and Self-Assembly of Novel Amphiphilic Block Copolymers with a Polyhedral Oligomeric Silsesquioxanes Moiety Attached at the Junction of the Two Blocks", Macromol. Rapid Commun. 2009, 30, 1015-1020.
Yanfang Zhou et al. "Improvements of photocurrent by using modified SiO2 in the poly(ether urethane)/poly(ethylene oxide) polymer electrolyte for all-solid-state dye-sensitized solar cells", Chem. Commun. 2009, 3895-3897.

* cited by examiner

ORGANIC-INORGANIC SILICON STRUCTURE-CONTAINING BLOCK COPOLYMER, ELECTROLYTE INCLUDING THE SAME, AND LITHIUM BATTERY INCLUDING THE ELECTROLYTE

CROSS-REFERENCE TO RELATED APPLICATION

This application claims priority to Korean Patent Application No. 10-2014-0119373, filed on Sep. 5, 2014, in the Korean Intellectual Property Office, and all the benefits accruing therefrom under 35 U.S.C. §119, the disclosure of which is incorporated herein in its entirety by reference.

BACKGROUND

1. Field

The present disclosure relates to organic-inorganic silicon structure-containing block copolymers, electrolytes including the same, and lithium batteries including the electrolytes.

2. Description of the Related Art

Lithium batteries can be used in a wide variety of applications due to their high voltage and high energy density. For example, lithium batteries may be utilized in electric vehicles such as hybrid electric vehicles (HEVs) and plug-in hybrid electric vehicles (PHEVs). To be used in electric vehicles, lithium batteries should be capable of operating at high temperatures, and should have high charge and discharge capacities, and long lifespans.

Particularly, due to their high energy density and high discharge voltage lithium batteries including a polymer electrolyte have attracted a significant amount of research. Polyethylene oxide (PEO) is most often used as the polymer electrolyte in the lithium battery.

However, although the polymer electrolyte including PEO has a relatively high ion conductivity of $10^{-4}$ Siemens per centimeter (S/cm) at a high temperature of 60° C. or greater, the ion conductivity may be decreased to $10^{-6}$ S/cm at room temperature. In addition, the polymer electrolyte including PEO has poor mechanical properties and a low electrochemical stability at less than 3.8 volts (V).

Thus, there is a need to develop a novel organic-inorganic silicon structure-containing block copolymer having high ion conductivity, high lithium ion mobility and excellent mechanical properties at a relatively low temperature or at room temperature, an electrolyte including the same, and a lithium battery including the electrolyte having high electrochemical stability and excellent lifespan characteristics.

SUMMARY

Provided are novel organic-inorganic silicon structure-containing block copolymers having high ion conductivity, high lithium ion mobility, and excellent mechanical properties at room temperature.

Provided are electrolytes including the novel organic-inorganic silicon structure-containing block copolymers.

Provided are lithium batteries including the electrolytes and having high electrochemical stability and excellent lifespan characteristics.

Additional aspects will be set forth in part in the description which follows and, in part, will be apparent from the description, or may be learned by practice of the presented exemplary embodiments.

According to an aspect of an exemplary embodiment, an organic-inorganic silicon structure-containing block copolymer includes a first domain including an ion conductive polymer block, and a second domain including a polymer block including a non-conducting polymer and an organic-inorganic silicon structure, wherein the organic-inorganic silicon structure is covalently connected to a side chain connected to a backbone of the non-conducting polymer.

According to an aspect of another exemplary embodiment, an electrolyte includes a polymer matrix, the organic-inorganic silicon structure-containing block copolymer, and a lithium salt.

According to an aspect of another exemplary embodiment, a lithium battery includes a positive electrode including a positive active material, a negative electrode allowing intercalation and deintercalation of lithium ions, and an electrolyte interposed between the positive electrode and the negative electrode, wherein the electrolyte is the aforementioned electrolyte.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
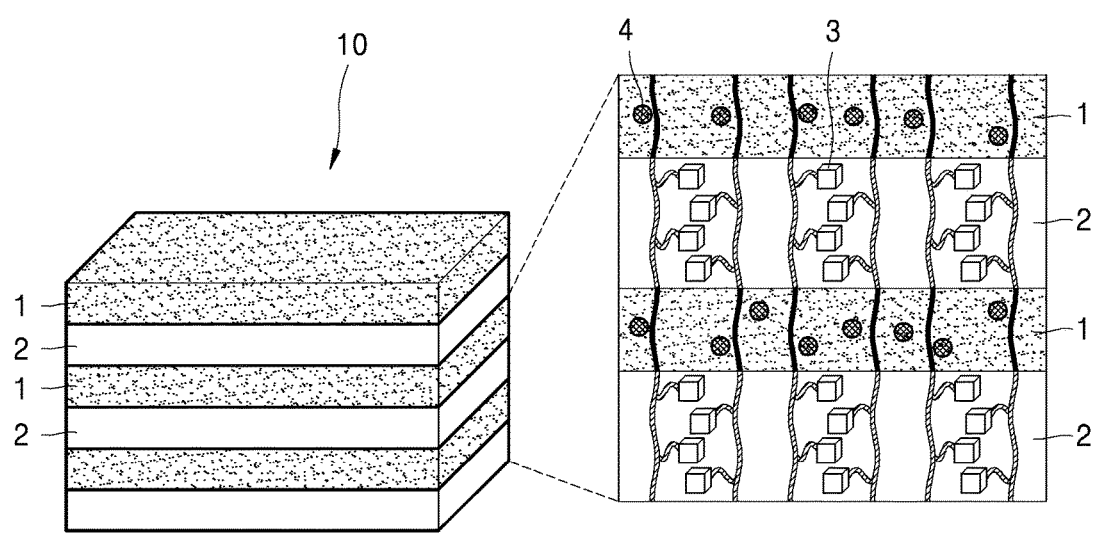
FIG. 1 is a schematic diagram of an organic-inorganic silicon structure-containing block copolymer according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an organic-inorganic silicon structure-containing block copolymer, an electrolyte including the same, and a lithium battery including the electrolyte according to an exemplary embodiment will be described in detail. The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art.

FIG. 1 is a schematic diagram of an organic-inorganic silicon structure-containing block copolymer 10 according to an exemplary embodiment.

Referring to FIG. 1, the organic-inorganic silicon structure-containing block copolymer 10 according to an exemplary embodiment includes a first domain 1 including an ion conductive polymer block, and a second domain 2 including a polymer block including a non-conducting polymer and an organic-inorganic silicon structure 3. The organic-inorganic silicon structure 3 may be connected to a side chain connected to a backbone of the non-conducting polymer. Lithium ion 4 is present in first domain 1.

In general, when inorganic particles are added to a polymer electrolyte, mechanical properties are enhanced while ion conductivity is reduced as dispersity and interface resistance is increased. Accordingly, a lithium battery including a polymer electrolyte having inorganic particles may have low electrochemical stability and poor lifespan characteristics.

The organic-inorganic silicon structure-containing block copolymer is a block copolymer of an organic-inorganic silicon structure, the organic-inorganic silicon structure having a size of about 1 nanometers (nm) to about 6 nm with properties of both organic and inorganic materials and having a cage-like type structure in a linear, circular, cubical, hexagonal, or octagonal shape.

The organic-inorganic silicon structure may be covalently connected to a terminal end of a backbone of the non-conducting polymer included in the second domain or may be covalently connected to a junction between the first domain and the second domain. When a polymer electrolyte including the organic-inorganic silicon structure-containing block copolymer has the structure as described above, low compatibility between the ion conductive polymer portion and the non-conducting polymer portion may cause microphase separation therebetween. Thus, in such a polymer electrolyte, enhancement of mechanical properties, and in particular, mechanical strength, is negligible.

In contrast, the organic-inorganic silicon structure according to an exemplary embodiment may be covalently connected to a side chain connected to a backbone of the non-conducting polymer contained in the second domain. A polymer electrolyte including this organic-inorganic silicon structure-containing block copolymer may have reduced empty space between the polymer chains, and therefore, a more rigid and denser structure. Thus, mechanical properties, in particular mechanical strength of the polymer electrolyte may be enhanced.

The organic-inorganic silicon structure-containing block copolymer 10 may include a copolymer block in which the organic-inorganic silicon structure is covalently bonded to a side chain connected to a backbone of the non-conducting polymer. The block copolymer may be synthesized by a method such as atom transfer radical polymerization, ring-opening metathesis polymerization, anionic and cationic polymerization, or free radical polymerization. For example, to form a block copolymer according to the free radical polymerization method, a polymer monomer A suitable for forming a non-conducting polymer and covalently bonded to the organic-inorganic silicon structure, and a co-polymerizable monomer B suitable for forming an ion-conducting polymer and that it is not covalently bonded to the organic-inorganic silicon structure, are first dissolved in respective solvents. Then, a polymerization initiator is added to a solution of the monomer B in an amount of about 1 to about 5 percent by weight (% by weight) based on a weight of the monomer B, and the mixture is sufficiently stirred. Then, the polymer monomer A is added thereto, and the resulting mixture is maintained at a temperature of about 60 to about 70° C. for about 8 to about 10 hours. The obtained polymer solution is diluted with a solvent used in the reaction to remove unreacted monomers, and polymer precipitate is collected using ethanol or methanol. Then, the resultant is dried to provide the block copolymer.

The organic-inorganic silicon structure may include a group represented by Formula 1 below.

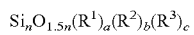  Formula 1

$$Si_nO_{1.5n}(R^1)_a(R^2)_b(R^3)_c$$

In Formula 1, n=a+b+c+1 and 6≤n≤20, and $R^1$, $R^2$, and $R^3$ are each independently at least one selected from a hydrogen atom, an organic functional group, and a silicon functional group.

The organic-inorganic silicon structure covalently connected to a side chain may be connected to a backbone of the non-conducting polymer in a variety of ways. For example, the side chain may be connected to a polymer chain grafted to the backbone of the non-conducting polymer. Each graft can contain a single or multiple organic-inorganic silicon structures connected by a side chain. Alternatively, each side chain can be directly linked to the polymer backbone of the non-conducting polymer. In an exemplary embodiment, the second domain may include a repeating unit block represented by Formula 2 below.

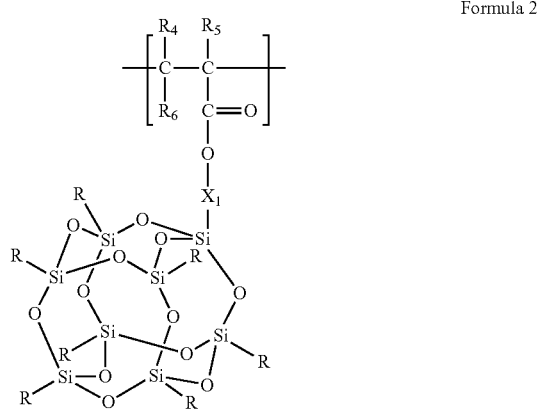

Formula 2

In Formula 2, R may be at least one selected from a hydrogen atom, a substituted or unsubstituted C1-C20 alkyl group, a hydroxyl group, a vinyl ether group, a substituted or unsubstituted ethylene oxide group, a substituted or unsubstituted acrylate group, a substituted or unsubstituted methacrylate group, a substituted or unsubstituted glycidyl ether group, a substituted or unsubstituted epoxy group, and a substituted or unsubstituted oxetane group, $R_4$, $R_5$, and $R_6$ may be each independently at least one selected from a hydrogen atom, a halogen atom, a substituted or unsubstituted C1-C20 alkyl group, and a substituted or unsubstituted C1-C20 alkoxy group, $X_1$ may be a substituted or unsubstituted C1-C20 alkylene group or a substituted or unsubstituted C1-C20 heteroalkylene group, and a number average molecular weight Mn of the repeating unit block may be about 10,000 Daltons (Da) to about 400,000 Da. For example, the number average molecular weight Mn of the repeating unit block may be about 10,000 Da to about 350,000 Da. For another example, the number average molecular weight Mn of the repeating unit block may be about 10,000 Da to about 300,000 Da.

Hereinafter, a substituent used in Formula 2 may be defined as follows.

The term "substituted" used in the substituted alkyl group, the substituted alkoxy group, the substituted alkylene group, the substituted ethylene oxide group, the substituted acrylate group, the substituted methacrylate group, the substituted glycidyl ether group, the substituted epoxy group, and the substituted oxetane group indicates that at least one hydrogen atom of the above mentioned groups is substituted with a halogen atom, a C1-C20 alkyl group substituted with a halogen atom (e.g.: $CF_3$, $CHCF_2$, $CH_2F$, and $CCl_3$), a hydroxyl group, a nitro group, a cyano group, an amino group, an amidino group, a hydrazine group, a hydrazone group, a carboxylic acid group and a salt thereof, a sulfonic acid group and a salt thereof, a phosphoric acid group and a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

A "$C_1$-$C_{20}$ alkyl group" used herein refers to a linear or branched aliphatic hydrocarbon monovalent group having 1 to 20 carbon atoms. Examples of the "C1-C20 alkyl group" used in Formula 2 may include methyl, ethyl, propyl, isobutyl, sec-butyl, tert-butyl, neo-butyl, iso-amyl, and hexyl.

A "$C_1$-$C_{20}$ alkoxy group" used herein refers to a monovalent group represented by —$OA_{101}$ (wherein $A_{101}$ is the $C_1$-$C_{20}$ alkyl group). Examples of the "C1-C20 alkoxy group" used in Formula 2 may include methoxy, ethoxy, and propoxy.

A "$C_1$-$C_{20}$ alkylene group" used herein refers to a divalent fully saturated branched or unbranched (or straight chain or linear) hydrocarbon group having the same structure as the $C_1$-$C_{20}$ alkyl group. Examples of the "C1-C20 alkylene group" used in Formula 2 may include methylene, ethylene, propylene, isobutylene, sec-butylene, tert-butylene, neo-butylene, iso-amylene, and hexylene.

A "$C_1$-$C_{20}$ heteroalkylene group" refers to a divalent fully saturated branched or unbranched (or straight chain or linear) hydrocarbon group having at least one heteroatom selected from N, O, P, and S and carbon as remaining atoms. Example of the "$C_1$-$C_{20}$ heteroalkylene group" used in Formula 2 is ethyleneoxyethylene.

A "$C_6$-$C_{10}$ aryl group" refers to a monovalent aromatic system including at least one ring. Examples of the "$C_6$-$C_{10}$ aryl group" are phenyl, naphthyl, and tetrahydronaphthyl.

Examples of the "ethylene oxide group" used in Formula 2 may include a group of the formula

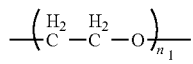

(wherein $n_1$ is an integer from 1 to 5), wherein one or more hydrogen atoms of the formula

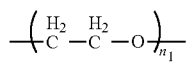

(wherein $n_1$ is an integer from 1 to 5) may be replaced with substituted groups as defined above.

As used herein the "acrylate group" used in Formula 2 may include a group of the formula

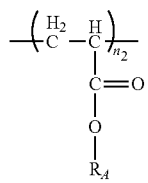

(wherein $n_2$ is an integer from 1 to 5, and $R_A$ is selected from a hydrogen atom, a halogen atom, a C1-C5 alkyl group, and a C6-C10 aryl group). Examples of the "acrylate group" in Formula 2 include groups wherein $R_A$ is methyl, ethyl, n-propyl, i-propyl, n-butyl, or i-butyl.

As used herein the "methacrylate group" used in Formula 2 may include a group of the formula

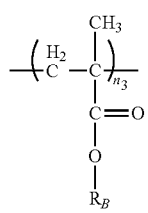

(where $n_3$ is an integer from 1 to 5, and $R_B$ is selected from a hydrogen atom, a halogen atom, a C1-C5 alkyl group, and a C6-C10 aryl group). Examples of the "methacrylate group" used in Formula 2 include groups wherein $R_B$ is methyl, ethyl, n-propyl, i-propyl, n-butyl, or i-butyl.

As used herein the "glycidyl ether group" used in Formula 2 may include a group of the formula

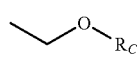

(wherein $R_C$ is selected from a C1-C5 alkyl group and a C6-C10 aryl group). Examples of the "glycidyl ether group" used in Formula 2 include groups wherein $R_B$ is methyl, ethyl, n-propyl, i-propyl, n-butyl, or i-butyl.

As used herein the "oxetane group" used in Formula 2 may include a group of the formula

wherein one or more of the hydrogen atoms may be substituted as described above or unsubstituted. Examples of the "oxetane group" of used in Formula 2 include groups that are not substituted.

Here, R may include an epoxy group or a vinyl ether group.

The organic-inorganic silicon structure-containing block copolymer may be represented by at least one selected from Formulae 3 to 5.

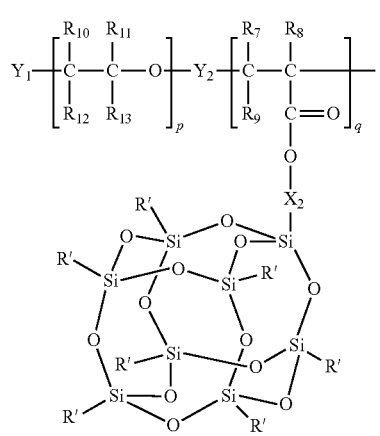

Formula 3

In Formula 3, p may be from 2 to 25 and q may be from 2 to 25, R' may be at least one selected from a hydrogen atom, a hydroxyl group, a vinyl ether group, a substituted or unsubstituted C1-C20 alkyl group, a substituted or unsubstituted ethylene oxide group, a substituted or unsubstituted acrylate group, a substituted or unsubstituted methacrylate group, a substituted or unsubstituted glycidyl ether group, a substituted or unsubstituted epoxy group, and a substituted or unsubstituted oxetane group, $R_7$, $R_8$, $R_9$, $R_{10}$, $R_{11}$, $R_{12}$, and $R_{13}$ may be each independently at least one selected from a hydrogen atom, a halogen atom, a substituted or unsubstituted C1-C20 alkyl group, and a substituted or unsubstituted C1-C20 alkoxy group, $X_2$ may be a substituted or unsubstituted C1-C20 alkylene group or a substituted or unsubstituted C1-C20 heteroalkylene group, $Y_1$ may be at least one selected from a hydrogen atom, a halogen atom, a substituted or unsubstituted C1-C20 alkyl group, and a substituted or unsubstituted C1-C20 alkoxy group, and $Y_2$ may be at least one selected from a single bond, a substituted or unsubstituted C1-C20 alkylene group, a substituted or unsubstituted C1-C20 heteroalkylene group, a substituted or unsubstituted C1-C20 sulfonylalkylene group, and a substituted or unsubstituted C1-C20 carbonylalkylene group.

Formula 4

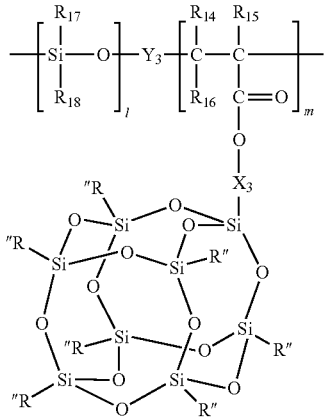

In Formula 4, l may be from 2 to 25 and m may be from 2 to 25, R" may be at least one selected from a hydrogen atom, a hydroxyl group, a vinyl ether group, a substituted or unsubstituted C1-C20 alkyl group, a substituted or unsubstituted ethylene oxide group, a substituted or unsubstituted acrylate group, a substituted or unsubstituted methacrylate group, a substituted or unsubstituted glycidyl ether group, a substituted or unsubstituted epoxy group, and a substituted or unsubstituted oxetane group, $R_{14}$, $R_{15}$, $R_{16}$, $R_{17}$, and $R_{18}$ may be each independently at least one selected from a hydrogen atom, a halogen atom, a substituted or unsubstituted C1-C20 alkyl group, and a substituted or unsubstituted C1-C20 alkoxy group, $X_3$ may be a substituted or unsubstituted C1-C20 alkylene group or a substituted or unsubstituted C1-C20 heteroalkylene group, and $Y_3$ may be at least one selected from a single bond, a substituted or unsubstituted C1-C20 alkylene group, a substituted or unsubstituted C1-C20 heteroalkylene group, a substituted or unsubstituted C1-C20 sulfonylalkylene group, a substituted or unsubstituted C1-C20 carbonylalkylene group, and a group of formula

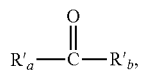

wherein $R'_a$ and $R'_b$ may be each independently a substituted or unsubstituted C1-C20 alkylene group or a substituted or unsubstituted C1-C20 heteroalkylene group.

Formula 5

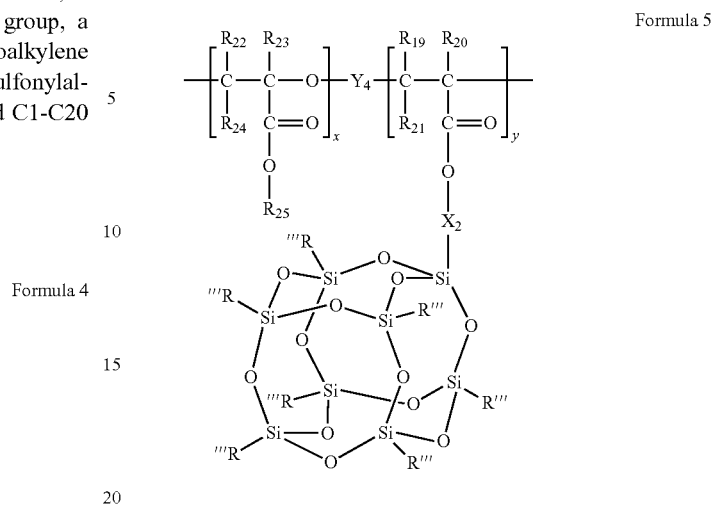

In Formula 5, x may be from 2 to 25 and y may be from 2 to 25, R''' may be at least one selected from a hydrogen atom, a hydroxyl group, a vinyl ether group, a substituted or unsubstituted C1-C20 alkyl group, a substituted or unsubstituted ethylene oxide group, a substituted or unsubstituted acrylate group, a substituted or unsubstituted methacrylate group, a substituted or unsubstituted glycidyl ether group, a substituted or unsubstituted epoxy group, and a substituted or unsubstituted oxetane group, $R_{19}$, $R_{20}$, $R_{21}$, $R_{22}$, $R_{23}$, $R_{24}$, and $R_{25}$ may be each independently at least one selected from a hydrogen atom, a halogen atom, a substituted or unsubstituted C1-C20 alkyl group, and a substituted or unsubstituted C1-C20 alkoxy group, $X_4$ may be a substituted or unsubstituted C1-C20 alkylene group or a substituted or unsubstituted C1-C20 heteroalkylene group, and $Y_4$ may be at least one selected from a single bond, a substituted or unsubstituted C1-C20 alkylene group, a substituted or unsubstituted C1-C20 heteroalkylene group, a substituted or unsubstituted C1-C20 sulfonylalkylene group, and a substituted or unsubstituted C1-C20 carbonylalkylene group.

A "C1-C20 carbonylalkylene group" refers to a "$C_1$-$C_{20}$ alkylene group" as defined above, wherein one or more non-adjacent methylene (—$CH_2$—) groups are substituted with a carbonyl group (—C(=O)—). Examples of the "C1-C20 carbonylalkylene group" used in Formula 3 may include carbonylmethylene (C1), carbonylethylene (C2), carbonylpropylene (C3), carbonylbutylene (C4), carbonylisobutylene (C4), and carbonyl t-butylene (C4).

A "C1-C20 sulfonylalkylene group" refers to a "$C_1$-$C_{20}$ alkylene group" as defined above, wherein one or more non-adjacent methylene (—$CH_2$—) groups are substituted with a sulfonyl group (—$S(=O)_2$—). Examples of the "C1-C20 sulfonylalkylene group" used in Formula 3 may include sulfonylmethylene (C1), sulfonylethylene (C2), sulfonylpropylene (C3), sulfonylbutylene (C4), sulfonylisobutylene (C4), and sulfonyl t-butylene (C4).

The substituents used in Formulae 3 to 5 are the same as those defined in Formula 2. R', R", and R''' may respectively include an epoxy group or a vinyl ether group.

For example, the organic-inorganic silicon structure-containing block copolymer represented by Formula 3 may be an organic-inorganic silicon structure-containing block copolymer represented by Formula 3a below.

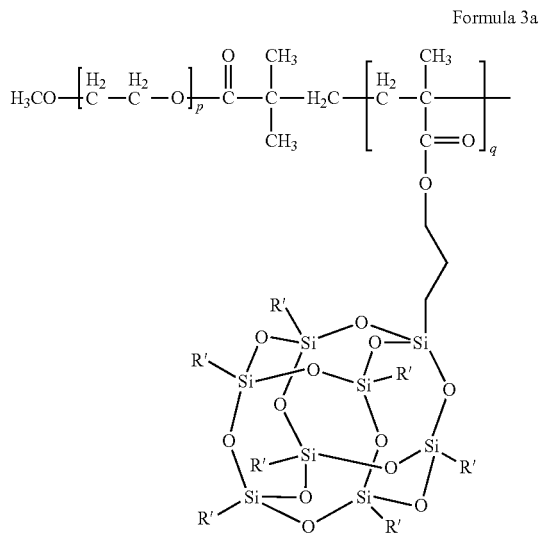

Formula 3a

In Formula 3a, p is from 2 to 25 and q is from 2 to 25, and R' is an isobutyl group.

For example, the organic-inorganic silicon structure-containing block copolymer represented by Formula 4 may be an organic-inorganic silicon structure-containing block copolymer represented by Formula 4a below.

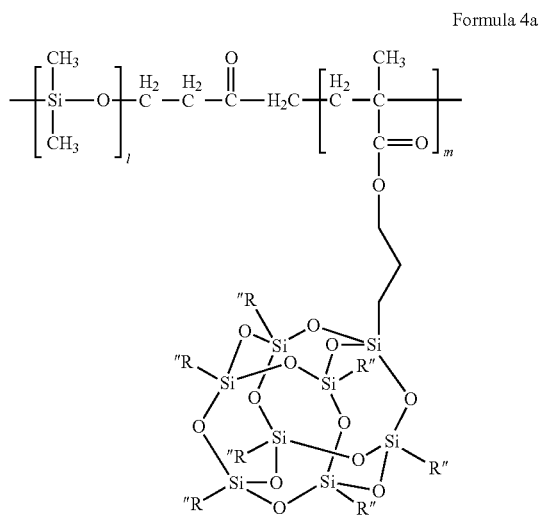

Formula 4a

In Formula 4a, l is from 2 to 25 and m is from 2 to 25, and R'' is an isobutyl group.

For example, the organic-inorganic silicon structure-containing block copolymer represented by Formula 5 may be an organic-inorganic silicon structure-containing block copolymer represented by Formula 5a below.

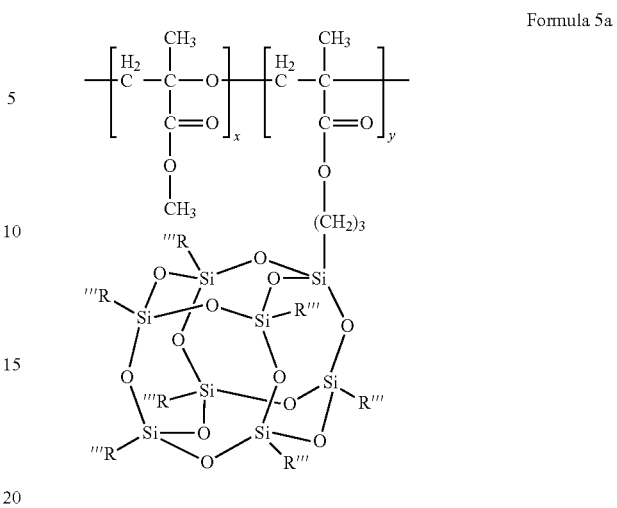

Formula 5a

In Formula 5a, x is from 2 to 25 and y is from 2 to 25, and R''' is an isobutyl group.

The ion conductive polymer block may be selected from a polyethylene oxide (PEO) block, a polysiloxane block, a polypropylene oxide (PPO) block, a polyethylene oxide-grafted polymethacrylate (PEO-grafted PMMA) block, and a polysiloxane-grafted PMMA block.

The non-conducting polymer block may be selected from a polystyrene (PS) block, a polymethylmethacrylate (PMMA) block, a polypropylmethacrylate block, a poly(n-butylmethacrylate) block, a poly(t-butylmethacrylate) block, a polyvinylpyridine block, a polyimide block, a polyethylene block, a polypropylene block, a polyvinylidene fluoride (PVdF) block, a polyacrylonitrile (PAN) block, and a polydimethylsiloxane (PDMS) block.

The organic-inorganic silicon structure-containing block copolymer may include at least one selected from a diblock copolymer and a triblock copolymer. The organic-inorganic silicon structure-containing block copolymer may include at least one selected from an AB diblock copolymer, an ABA triblock copolymer, and an ABA' triblock copolymer. Here, A' may be an ion conductive polymer block or a non-conducting polymer block similar to A.

For example, the organic-inorganic silicon structure-containing block copolymer may include at least one selected from PEO-polystyrene (PS), a polyethylene oxide-grafted polymethylmethacrylate (PEO-PMMA), PS-polysiloxane, polysiloxane-PMMA, PS-PEO-PS, and PEO-PPO-PEO, without being limited thereto. Any combination of the ion conductive polymer block and the non-conducting polymer block may be used.

An electrolyte according to another exemplary embodiment may include a polymer matrix, the aforementioned organic-inorganic silicon structure-containing block copolymer, and a lithium salt. The electrolyte may have enhanced dispersity and enhanced mechanical strength of an ion conductive channel. Accordingly, the electrolyte may have high ion conductivity, high lithium ion mobility, and excellent mechanical properties at room temperature.

The polymer matrix may include at least one selected from a homopolymer or a block copolymer. The homopolymer may include at least one selected from PEO, PMMA, PS, PAN, and PVdF.

The block copolymer of the polymer matrix may include a third domain including an ion conductive polymer block and a fourth domain adjacent to the third domain and including a non-conducting polymer block.

For example, the ion conductive polymer block contained in the third domain may be selected from a PEO block, a polysiloxane block, a PPO block, a PEO-grafted PMMA block, and a polysiloxane-grafted PMMA block.

For example, the non-conducting polymer contained in the fourth domain may be selected from a PS block, a PMMA block, a polypropylmethacrylate block, a poly(n-butylmethacrylate) block, a poly(t-butylmethacrylate) block, a polyvinylpyridine block, a polyimide block, a polyethylene block, a polypropylene block, a PVdF block, a PAN block, and a PDMS block.

The block copolymer of the polymer matrix may include at least one selected from a diblock copolymer and a triblock copolymer. Examples of the block copolymer may include an AB diblock copolymer, an ABA triblock copolymer, or an ABA' triblock copolymer. Here, A' may be an ion conductive polymer block or a non-conducting polymer block similar to A.

For example, the block copolymer of the polymer matrix may include PEO-PS, PEO-PMMA, PS-polysiloxane, polysiloxane-PMMA, PS-PEO-PS, or PEO-PPO-PEO, without being limited thereto. Any combination of the ion conductive polymer block and the non-conducting polymer block may be used.

The block copolymer of the polymer matrix may include a linear block copolymer or a branched block copolymer. The block copolymer may have a lamellar shape, a cylindrical shape, or a gyroid shape. The branched block copolymer may be a graft polymer shape, a star-shaped polymer, a comb polymer, a brush polymer, or a polymer network, without being limited thereto. In general, any branched block copolymer commonly used in the art may also be used here.

Figure 2:
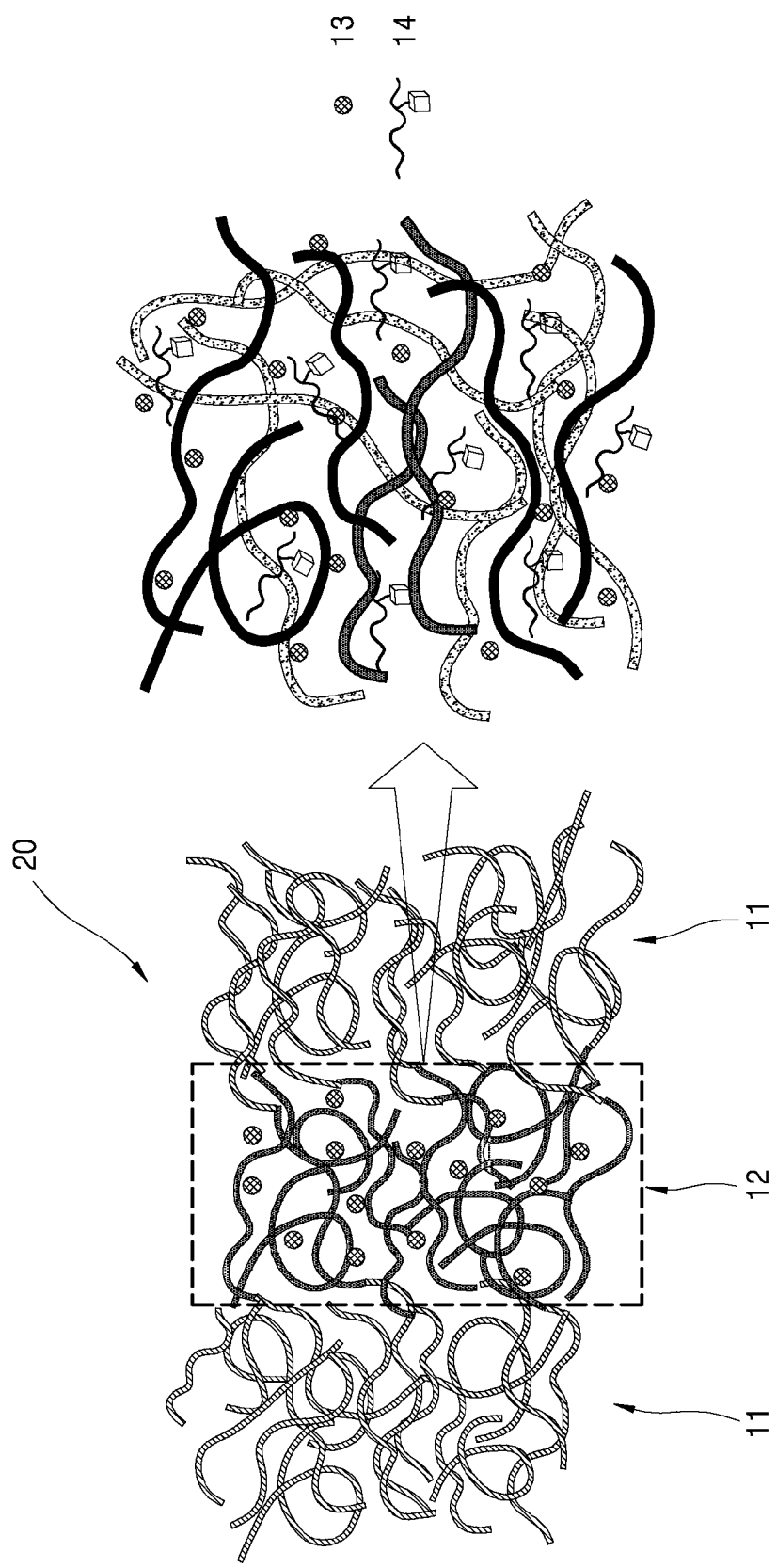
FIG. 2 is a schematic diagram of a polymer matrix included in an electrolyte according to an exemplary embodiment.

FIG. 2 is a schematic diagram of a polymer matrix included in an electrolyte according to an exemplary embodiment.

Referring to FIG. 2, the polymer matrix 20 included in the electrolyte is a block copolymer, the organic-inorganic silicon structure-containing block copolymer 14 is contained in a third domain 12, wherein lithium ions 13 migrate.

The third domain 12 may have a size $D_3$ of about 10 nm to about 100 nm. For example, the size $D_3$ of the third domain 12 may be about 20 nm to about 90 nm. For another example, the size $D_3$ of the third domain 12 may be about 20 nm to about 80 nm. In general, a domain size may be determined by transmission electron microscopy or small angle X-ray scattering (SAXS).

A number average molecular weight Mn of the ion conductive polymer block contained in the third domain 12 may be 10,000 Daltons (Da) or greater. For example, the number average molecular weight Mn of the ion conductive polymer block may be in a range of about 10,000 Da to about 500,000 Da. For another example the number average molecular weight Mn of the ion conductive polymer block may be in a range of about 10,000 Da to about 100,000 Da. When the ion conductive polymer block has the number average molecular weight Mn within the ranges described above, ion conductivity may be enhanced due to an appropriate chain length, i.e., an appropriate degree of polymerization.

A number average molecular weight Mn of the non-conducting polymer block contained in the fourth domain 11 may be 10,000 Da or greater. For example, the number average molecular weight Mn of the non-conducting polymer block may be in a range of about 10,000 Da to about 500,000 Da. For example, the number average molecular weight Mn of the non-conducting polymer block may be in a range of about 10,000 Da to about 400,000 Da. When the non-conducting polymer block has the number average molecular weight Mn within the ranges described above, mechanical properties may be enhanced due to an appropriate chain length, i.e., an appropriate degree of polymerization.

A content of organic-inorganic silicon structure contained in the organic-inorganic silicon structure-containing block copolymer may be in a range of about 2% by weight to about 10% by weight, for example, about 2% by weight to about 8% by weight, and for another example, about 2% by weight to about 5% by weight based on a total weight of the polymer matrix. When the content of the organic-inorganic silicon structure is greater than 10% by weight based on the total weight of the polymer matrix, mechanical properties may be enhanced but ion conductivity may be reduced. On the other hand, when the content of the organic-inorganic silicon structure is less than 2% by weight based on the total weight of the polymer matrix, improvement of ion conductivity and mechanical properties is negligible.

The electrolyte may further include at least one selected from an organic solvent, an ionic liquid, an oligomer, and an inorganic particle.

For example, the organic solvent may include at least one selected from ethylene carbonate (EC), propylene carbonate (PC), dimethyl carbonate (DMC), fluoroethylene carbonate (FEC), ether, tetrahydrofuran (THF), 1,3-dioxolane, 1,4-dioxane, ethyl acetate, acetonitrile, acetone, and 2,2-dimethoxy-2-phenylacetophenone (DMP). The organic solvent may further enhance ion conductivity. However, the organic solvent is not limited thereto, and any suitable organic solvent commonly used in the art may also be used.

A content of the organic solvent may be in a range of about 1% by weight to about 20% by weight, for example, about 2% by weight to about 20% by weight, and for another example, about 5% by weight to about 20% by weight, based on the total weight of the electrolyte. When the content of the organic solvent is within the ranges described above, ion conductivity and mechanical properties sufficient for battery performance may be obtained.

The ionic liquid may include at least one cation selected from pyrrolidinium, pyridinium, imidazolium, piperidinium, and ammonium, and an least one anion selected from bis(trifluoromethylsulfonyl)imide, bromide, chloride, dicyanamide, hexafluorophosphate, phosphate, sulfate, iodide, sulfonate, nitrate, tetrafluoroborate, thiocyanate, and triflate. Any ionic liquid containing an appropriate functional group may also be used. The ionic liquid may be added to the block copolymer to further enhance ion conductivity, so a lithium battery including the ionic liquid may have increased capacity.

An ionic liquid/lithium ion (IL/Li) molar ratio may be in the range of about 0.1 to about 2.0. For example, the IL/Li molar ratio may be in the range of about 0.2 to about 1.8. For another example, the IL/Li molar ratio may be in the range of about 0.4 to about 1.5. The ionic liquid having the IL/Li molar ratio within the ranges described above may be used to complement to mobility of ions, i.e., lithium ion mobility, thereby enhancing ion conductivity. In addition, the ionic liquid having the IL/Li molar ratio within the ranges described above may have mechanical properties to inhibit lithium dendrite from growing from a surface of a negative electrode.

The oligomer may include an ethylene oxide repeating unit and have a number average molecular weight Mn of about 200 Da to about 2,000 Da. For example, the oligomer may include at least one selected from poly(ethylene glycol) dimethyl ether (PEGDME, polyglyme), tetra(ethylene glycol) dimethyl ether (TEGDME, tetraglyme), polytri(ethylene glycol) dimethyl ether (triglyme), poly(ethylene glycol) dilaurate (PEGDL), poly(ethylene glycol) monoacrylate (PEGMA), poly(diethylene glycol) dimethyl ether (PDEGDME), and poly(ethylene glycol) diacrylate (PEGDA).

A content of the oligomer may be in the range of about 5% by weight to about 50% by weight based on a total weight of the electrolyte. For example, the content of the oligomer may be in the range of about 10% by weight to about 40% by weight based on the total weight of the electrolyte. For example, the content of the oligomer may be in the range of about 15% by weight to about 30% by weight based on the total weight of the electrolyte. The oligomer having the content within the ranges described above may have enhanced lithium ion mobility.

The inorganic particle may include an inorganic particle of at least one selected from $SiO_2$, $TiO_2$, ZnO, $Al_2O_3$, $BaTiO_3$, and a metal-organic framework (MOF).

The inorganic particle may have an average particle diameter of about 5 nm to about 100 nm and for example, about 5 nm to about 90 nm. The inorganic particle may also include an inorganic particle functionalized by using an appropriate functional group. The inorganic particle may enhance mechanical properties of the block copolymer.

The MOF is a crystalline compound, for example, a porous crystalline compound. The MOF may be formed via a making chemical bond between a metal ion or metal ion cluster and an organic ligand.

The metal ion constituting the MOF may be any metal ion efficiently forming a coordinate covalent bond or covalent bond. For example, the metal ion may include at least one selected from $Zn^{2+}$, $Ti^{4+}$, $Fe^{2+}$, $Fe^{3+}$, $V^{4+}$, $V^{3+}$, $V^{2+}$, $Zr^{4+}$, $Cu^{1+}$, $Cu^{2+}$, and $Cu^{3+}$ or an oxo-centered metal cluster ion including the metal ion. The organic ligand may be any organic material having a group forming a coordinate covalent bond, ionic bond, or covalent bond with the metal ion, such as carboxylic acid or imidazole or any organic material having at least two binding sites for a coordinate covalent bonding, ionic bonding, or covalent bonding to form a stable MOF, i.e., a bidentate or tridentate. For example, the organic ligand may include at least one selected from aromatic dicarboxylic acid, aromatic tricarboxylic acid, imidazole-based compound, and any combination thereof. Examples of the aromatic dicarboxylic acid or aromatic tricarboxylic acid may include benzene dicarboxylic acid, benzene tricarboxylic acid, naphthalene dicarboxylic acid, biphenyl dicarboxylic acid, or triphenyl dicarboxylic acid. A content of the organic ligand may be equal to or greater than 1 mole (mol) based on 1 mol of the metal ion.

A content of the inorganic particle may be in the range of about 1% by weight to about 40% by weight based on the total weight of the electrolyte. For example, the content of the inorganic particle may be in the range of about 2% by weight to about 20% by weight based on the total weight of the electrolyte. For another example, the content of the inorganic particle may be in the range of about 5% by weight to about 12% by weight based on the total weight of the electrolyte. The inorganic particle having the content within the ranges described above may have mechanical properties suitable for battery performance, may be uniformly dispersed in the polymer electrolyte, and may enhance its ion conductivity.

The lithium salt may include at least one selected from lithium trifluoromethanesulfonimide (LiTFSI), $LiBF_4$, $LiPF_6$, lithium bis (oxalato) borate (LiBOB), and $LiClO_4$. However, the lithium salt is not limited thereto, and any lithium salt commonly used in the art may also be used here. A content of the lithium salt may be in the range of about 0.01 mol to about 3 mol based on 1 mol of the organic-inorganic silicon structure. The lithium salt having the content within the ranges described above may enable efficient migration of the lithium ions and may allow the electrolyte including the lithium salt to have suitable ion conductivity and viscosity. The ionic liquid, the oligomer, the inorganic particle, and the lithium salt may be introduced into the third domain.

The electrolyte may be at least one selected from a gel phase or solid phase layer. If required, the electrolyte may be a sheet-shaped electrolyte or a film-shaped electrolyte.

The electrolyte may have a thickness of 100 micrometers (μm) or less. For example, the electrolyte may have a thickness of 80 μm or less, and for another example, may have a thickness of 60 μm or less. The electrolyte may have high ion conductivity, excellent mechanical properties, and enhanced interface properties. Accordingly, a lithium battery including the electrolyte may have high electrochemical stability and excellent lifespan characteristics.

A lithium battery according to another exemplary embodiment includes a positive electrode including a positive active material, a negative electrode allowing intercalation and deintercalation of lithium ions, and an electrolyte interposed between the positive electrode and the negative electrode.

The lithium battery may be prepared in the following manner.

First, the positive electrode may be prepared as follows.

A positive active material, a conductive material, a binder, and a solvent are mixed to prepare a positive active material composition. The positive active material composition may be directly coated on a current collector and dried to prepare a positive electrode provided with the positive active material layer. Alternatively, the positive active material composition may be cast on a separate support, and then a film separated from the support is laminated on the current collector to prepare a positive electrode provided with the positive active material layer.

The positive active material may be any suitable material allowing intercalation and deintercalation of lithium ions commonly used in the art in positive electrodes. Examples of the positive active material allowing intercalation and deintercalation of lithium ions may include a compound represented by one of the following Formulae: $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $LiQO_2$; $LiQS_2$; $LiV_2O_5$;

LiI'O$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and LiFePO$_4$, without being limited thereto.

In the formulas, A is at least one selected from Ni, Co, and Mn; B' is at least one selected from Al, Ni, Co, Mn, Cr, Fe, Mg, Sr, V, and a rare earth element; D' is at least one selected from O, F, S, and P; E is at least one selected from Co and Mn; X is at least one selected from F, S, and P; G is at least one selected from Al, Cr, Mn, Fe, Mg, La, Ce, Sr, and V; Q is at least one selected from Ti, Mo, and Mn; I' is Cr, V, Fe, Sc, and Y; and J is at least one selected from V, Cr, Mn, Co, Ni, and Cu.

Examples of the conductive material include a carbonaceous material such as carbon black, graphite, natural graphite particulates, artificial graphite, acetylene black, ketjen black, carbon fiber, and carbon nanotube; a metal such as copper, nickel, aluminum, and silver, each of which may be used in powder, fiber, or tube form; and conductive polymers such as polyphenylene derivatives, without being limited thereto. Any other suitable materials commonly used in the art as the conductive material may also be used.

Examples of the binder include a vinylidene fluoride/hexafluoropropylene copolymer, polyvinylidene difluoride (PVDF), polyacrylonitrile, polymethylmethacrylate, polytetrafluoroethylene (PTFE), mixtures thereof, and a styrene butadiene rubber polymer.

In addition, examples of the binder include: polysaccharides and derivatives thereof such as starch, methylcellulose, carboxymethylcellulose, hydroxymethylcellulose, hydroxyethylcellulose, hydroxypropylcellulose, carboxymethylhydroxyethylcellulose, and nitrocellulose; phenol resin; melamine resin; polyurethane resin; urea resin; polyamide resin; polyimide resin; polyamideimide resin; petroleum pitch; and coal pitch. A plurality of binders may be used. The binder may be used as a thickener in an electrode mixture.

Examples of the solvent include N-methylpyrrolidone (NMP), acetone, and water, without being limited thereto. Any solvent commonly used in the art may also be used.

The current collector may be a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it can be easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The positive active material, the conductive material, the binder, and the solvent may be used in a content commonly used in the art in the manufacture of the lithium battery. At least one of the conductive material, the binder, and the solvent may not be used according to the use and the structure of the lithium battery. If desired, a plasticizer may further be added to the positive active material composition to form pores inside an electrode.

The negative electrode may be prepared in the same manner as the positive electrode, except that the negative active material is used instead of the positive active material.

For example, the negative electrode may be prepared in the following manner.

As the positive electrode, the negative electrode may be prepared by mixing a negative active material, a conductive material, a binder, and a solvent to prepare a negative active material composition and directly coating the composition on a current collector. Alternatively, the negative electrode may be prepared by casting the negative active material composition on a separate support, and then laminating a negative active material film separated from the support on the current collector.

The negative active material may include lithium metal, a metal that is alloyable (can form an alloy) with lithium, a transition metal oxide, a material that allows doping or undoping of lithium, and a material that allows reversible intercalation and deintercalation of lithium ions.

Examples of the transition metal oxide include vanadium oxide and lithium vanadium oxide. Examples of the material that allows doping or undoping of lithium include, Si, SiO$_x$ (wherein 0<x≤2), an Si—Y alloy, where Y is an alkali metal, an alkali earth metal, Group XIII elements to Group XVI elements, a transition metal, a rare earth element, or any combination thereof (except for Si), Sn, SnO$_2$, an Sn—Y alloy, where Y is an alkali metal, an alkali earth metal, Group XIII elements to Group XVI elements, a transition metal, a rare earth element, or any combination thereof (except for Sn), where at least one of these materials may be used in combination with SiO$_2$. In this regard, Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any combination thereof.

The material that allows reversible intercalation and deintercalation of lithium ions may be any carbonaceous material that is a carbonaceous negative active material commonly used in lithium-ion secondary batteries. Examples of the carbonaceous material may include crystalline carbon, amorphous carbon, or mixtures thereof. Examples of the crystalline carbon include natural graphite or artificial graphite that are in amorphous, plate, flake, spherical or fibrous form. Examples of the amorphous carbon include soft carbon (carbon sintered at low temperatures), hard carbon, meso-phase pitch carbides, sintered coke, and the like.

However, the negative active material is not limited thereto, and any suitable material commonly used in the art as a negative active material which includes or does not include lithium ions may also be used.

Any current collector may be used as the negative current collector without being limited by a material, shape, and manufacturing method thereof. For example, a copper foil having a thickness of about 10 to about 100 micrometers (µm), a perforated copper foil having a pore diameter of about 0.1 to about 10 millimeters (mm) and a thickness of about 10 to about 100 µm, an expanded metal, or a foamed metal plate may be used. In addition to copper, stainless steel, titanium, and nickel may also be used as a material to form the negative current collector.

The conductive material, the binder, and the solvent used in the negative active material composition may be the same as those used in the positive active material composition. If desired, a plasticizer may further be added to the positive active material composition and the negative active material composition to form pores inside the electrode plates.

The negative active material, the conductive material, the binder, and the solvent may be used in a content commonly used in the art in the manufacture of the lithium battery. At least one of the conductive material, the binder, and the solvent may not be used according to the use and the structure of the lithium battery.

Then, an electrolyte is prepared.

The electrolyte may include the aforementioned electrolyte. The electrolyte may include a gel phase electrolyte layer or a solid phase electrolyte layer. If required, the electrolyte may have a sheet-shaped electrolyte or a film-shaped electrolyte. The electrolyte may be formed on the negative electrode by sputtering or the like method.

The lithium battery may further include a protective layer formed on a portion of or the entire surface of the negative electrode or separately disposed between the negative electrode and the electrolyte.

The protective layer may not only inhibit growth of a lithium dendrite caused by a contact between the negative electrode and the electrolyte but may also enhance interface properties. Thus, a lithium battery including the protective layer may have high electrochemical stability and excellent lifespan characteristics.

The protective layer may have a single layer or multiple layers.

The protective layer may include a polymer matrix, an organic-inorganic silicon structure-containing block copolymer, and a lithium salt. The organic-inorganic silicon structure-containing block copolymer may include a first domain including an ion conductive polymer block and a second domain including a polymer block including a non-conducting polymer and an organic-inorganic silicon structure. The organic-inorganic silicon structure may be connected to a side chain connected to a backbone of the non-conducting polymer. The protective layer may have the same components and structure as the electrolyte as described above.

The protective layer may be a gel phase or solid phase layer. The protective layer may have a thickness of 100 μm or less. For example, the protective layer may have a thickness of 50 μm or less, for another example, a thickness of 10 μm or less, and for another example, a thickness of 2 μm or less.

The lithium battery may have an operation voltage of 4.5 volts (V)±0.5 V. For example, the lithium battery may have an operation voltage of about 4.5 V to about 5.0 V. The lithium battery may have a cylindrical shape, a rectangular shape, or a thin-film shape. For example, the lithium battery may be a large thin-film shaped battery. The separator may be interposed between the negative and the positive electrodes to form a battery assembly. When the battery assembly is stacked in a bi-cell structure and impregnated with an organic electrolytic solution, and the resultant is put into a pouch and sealed, preparation of a lithium-ion polymer battery is completed. In addition, a plurality of battery assemblies may be stacked to form a battery pack, which may be used in any device that requires high capacity and high output, for example, in laptop computers, smart phones, and electric vehicles.

The lithium battery according to an exemplary embodiment may be a lithium metal battery.

The lithium battery may include a positive electrode including a positive active material, a negative electrode having or not having lithium ions, and an electrolyte interposed between the positive electrode and the negative electrode. Here, the electrolyte may include a liquid electrolyte.

Figure 3:
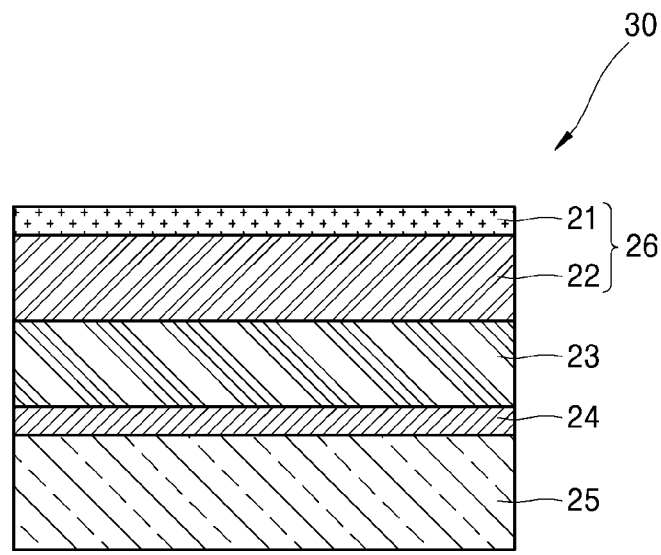
FIG. 3 is a schematic diagram of a lithium metal battery according to an exemplary embodiment.

FIG. 3 is a schematic diagram of a lithium metal battery 30 according to an exemplary embodiment.

The lithium metal battery 30 includes a negative electrode 25 formed of a lithium metal or a lithium metal alloy, a positive electrode 26 including a positive current collector 21 and a positive active material 22 disposed on the positive current collector 21, and a liquid electrolyte 23 interposed between the negative electrode 25 and the positive electrode 26. A protective layer 24 is disposed on the negative electrode 25.

A metal alloyable with the lithium metal may include at least one metal selected from Na, K, Rb, Cs, Fr, Be, Mg, Ca, Sr, Ba, Ra, Al, and Sn. The lithium metal or lithium metal alloy negative electrode may have a thickness of about 50 nm to about 100 μm, for example, a thickness of about 100 nm to about 1 μm, and for another example, a thickness of about 200 nm to about 500 nm. If required, the thickness of the negative electrode may be less than 500 nm, for example, less than 200 nm, for example, less than 100 nm, and for example, less than 50 nm.

Methods of fabricating the positive current collector 21, the positive active material 22, and the positive electrode 26 are as described above, and thus descriptions thereof will not be repeated.

For example, the liquid electrolyte 23 may be an organic electrolytic solution. The organic electrolytic solution may be prepared by dissolving a lithium salt in an organic solvent.

Any organic solvent commonly used in the art may be used. For example, the organic solvent may be propylene carbonate, ethylene carbonate, fluoroethylene carbonate (FEC), butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran (THF), 2-methyltetrahydrofuran, ethyl acetate, γ-butyrolactone, 1,3-dioxolane, 4-methyl-1,3-dioxolane, N,N-dimethylformamide, dimethyl acetamide, dimethylsulfoxide, 1,4-dioxane, 1,2-dimethoxyethane, sulfolane, dichloroethane, chlorobenzene, nitrobenzene, diethylene glycol, dimethyl ether, or any mixtures thereof.

If desired, a separator (not shown) may be interposed between the positive electrode and the negative electrode. The separator may be any separator commonly used in lithium batteries. Any separator having low resistance against migration of ions in the electrolyte and excellent electrolyte-retaining ability may be used. Examples of the separator may include glass fiber, polyester, Teflon, polyethylene, polypropylene, polytetrafluoroethylene (PTFE), and any combination thereof, each of which may be a non-woven or woven fabric form. For example, a windable separator including polyethylene or polypropylene may be used in a lithium-ion battery. A separator with an excellent organic electrolyte retaining capability may be used in a lithium-ion polymer battery.

For example, the separator may be manufactured in the following manner.

A polymer resin, a filler, and a solvent are mixed to prepare a separator composition. Then, the separator composition may be directly coated on a negative electrode, and then dried to form a separator. Alternatively, the separator composition may be cast on a support and then dried to form a separator film, and the separator film, separated from the support, may be laminated on a negative electrode to form the separator.

The polymer resin that may be used to manufacture the separator may be any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate and a mixture thereof.

In the lithium metal battery 30, the protective layer 24 is separately disposed on the negative electrode 25. The protective layer 24 may include a polymer matrix, an organic-inorganic silicon structure-containing block copolymer, and a lithium salt, and the organic-inorganic silicon structure-containing block copolymer may include a first domain including an ion conductive polymer block and a second domain including a polymer block including a non-conducting polymer and an organic-inorganic silicon structure. The organic-inorganic silicon structure may be connected to a side chain connected to a backbone of the non-conducting polymer. The protective layer may have the same components and structure as the electrolyte as described above.

The protective layer 24 may have a single layer or multiple layers including at least two layers.

The protective layer 24 may be at least one selected from a gel phase or solid phase layer. The protective layer 24 may have a thickness of 100 μm or less. For example, the protective layer may have a thickness of 50 μm or less, for another example, a thickness of 10 μm or less, and for another example, a thickness of 2 μm or less.

Although not shown, the protective layer 24 may be formed on a portion of or the entire surface of the negative electrode 25. The protective layer 24 may be a gel phase or solid phase layer. The thickness thereof may be 100 μm or less. For example, the thickness of the protective layer 24 may be 50 μm or less, for another example, 10 μm or less, and for another example, 2 μm or less.

The protective layer may not only inhibit growth of lithium dendrite caused by a contact between the negative electrode and the electrolyte but may also enhance interface properties. Accordingly, a lithium battery including the protective layer may have high electrochemical stability and excellent lifespan characteristics.

Hereinafter, one or more exemplary embodiments will be described in detail with reference to the following examples. However, these examples are not intended to limit the purpose and scope of the one or more exemplary embodiments.

In addition, some embodiments not described herein would have been apparent to one of ordinary skill in the art, and thus detailed descriptions thereof will not be given herein.

EXAMPLES

Preparation of Electrolyte

Example 1

Preparation of Electrolyte

Powder of an organic-inorganic silicon structure-containing block copolymer (poly(ethylene oxide-b-POSS-isoBuMA, where POSSisoBuMA=3-(3,5,7,9,11,13,15-heptacyclopentyl-pentacyclo[9.5.1.13,91.5,151.7,13]octasiloxane-1-yl) propyl methacrylate, Polymer Source, Inc.) having an average particle diameter of 6 nm and represented by Formula 3a below was prepared as an organic-inorganic silicon structure-containing block copolymer.

A polystyrene-b-poly(ethyleneoxide)-b-polystyrene (PS-b-PEO-b-PS) block copolymer (10-36-10 kilograms per mole (kg/mol), Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture. 2% by weight of the organic-inorganic silicon structure-containing block copolymer powder represented by Formula 3a based on a total weight of the polymer matrix was added to the mixture, and the resultant mixture was stirred at room temperature for 24 hours to prepare a slurry.

The slurry was cast on a Teflon dish. Tetrahydrofuran (THF) was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Formula 3a

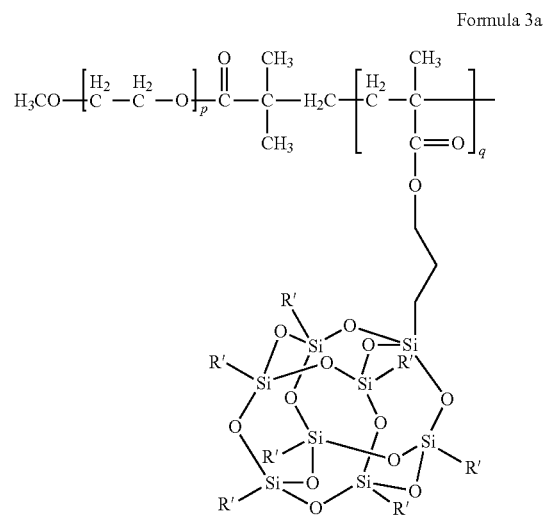

In Formula 3a, p is from 2 to 25 and q is from 2 to 25, and R' is an isobutyl group.

Example 2

Preparation of Electrolyte

Powder of an organic-inorganic silicon structure-containing block copolymer (Polymer Source, Inc.) having an average particle diameter of 6 nm and represented by Formula 5a below was prepared as an organic-inorganic silicon structure-containing block copolymer.

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture. 5% by weight of the organic-inorganic silicon structure-containing block copolymer powder represented by Formula 5a based on a total weight of the polymer matrix was added to the mixture, and the resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

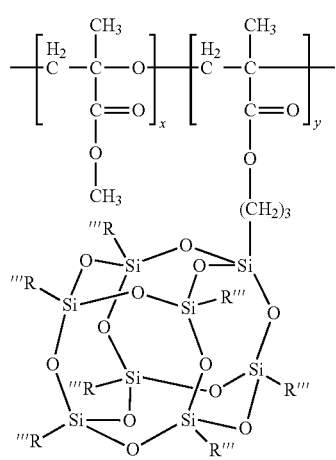

Formula 5a

In Formula 5a, x is from 2 to 25 and y is from 2 to 25, and R''' is an isobutyl group.

Example 3

Preparation of Electrolyte

Powder of an organic-inorganic silicon structure-containing block copolymer (poly(ethylene oxide-b-POSS-isoBuMA, POSSisoBuMA=3-(3,5,7,9,11,13,15-heptacyclopentyl-pentacyclo[9.5.1.13,91.5,151.7,13]octasiloxane-1-yl0 propyl methacrylate, Polymer Source, Inc.) having an average particle diameter of 6 nm and represented by Formula 3a was prepared as an organic-inorganic silicon structure-containing block copolymer.

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture.

N-butyl-N31 methylpyrrolidinium bis 3-trifluoromethanesulfonyl)imide (PYR14TFSI, ≥98% HLPC grade, number average molecular weight (Mn)=422.41 Da, C-TRI), as an ionic liquid, 18% by weight of poly(ethylene glycol) dimethyl ether (PEGDME, ≥99% HPLC grade, number average molecular weight (Mn)=250 Da, Sigma Aldrich Corporation), as an oligomer, and 5% by weight of Si having an average particle diameter of 7 nm were added to the mixture. In this regard, the ionic liquid/lithium ion (IL/Li) molar ratio was 0.8.

3% by weight of the organic-inorganic silicon structure-containing block copolymer powder represented by Formula 3a based on a total weight of the polymer matrix was added to the mixture, and the resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Example 4

Preparation of Electrolyte

Powder of an organic-inorganic silicon structure-containing block copolymer (poly(dimethylsiloxane-b-POSS-isoBuMA, wherein POSSisoBuMA=3-(3,5,7,9,11,13,15-heptacyclopentyl-pentacyclo[9.5.1.13,91.5,151.7,13]octasiloxane-1-yl0 propyl methacrylate, Polymer Source, Inc.) having an average particle diameter of 6 nm and represented by Formula 4a below was prepared as an organic-inorganic silicon structure-containing block copolymer.

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture. 2% by weight of the organic-inorganic silicon structure-containing block copolymer powder represented by Formula 4a based on a total weight of the polymer matrix was added to the mixture, and the resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

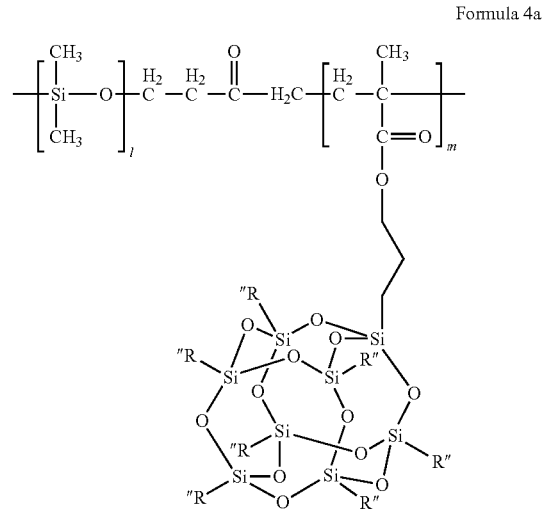

Formula 4a

In Formula 4a, l and m are mole fractions, and l is from 2 to 25 and m is from 2 to 25, and R'' is an isobutyl group.

Example 5

Preparation of Electrolyte

Powder of an organic-inorganic silicon structure-containing block copolymer (poly(dimethylsiloxane-b-POSS-isoBuMA, POSSisoBuMA=3-(3,5,7,9,11,13,15-heptacyclopentyl-pentacyclo[9.5.1.13,91.5,151.7,13]octasiloxane-1-yl) propyl methacrylate, Polymer Source, Inc.) having an average particle diameter of 6 nm and represented by Formula 4a was prepared as an organic-inorganic silicon structure-containing block copolymer.

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture. 5% by weight of the organic-inorganic silicon structure-containing block copolymer powder represented by Formula 4a based on a total weight of the polymer matrix was added to the mixture, and the resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Example 6

Preparation of Electrolyte

Powder of an organic-inorganic silicon structure-containing block copolymer (poly(dimethylsiloxane-b-POSS-isoBuMA, POSSisoBuMA=3-(3,5,7,9,11,13,15-heptacyclopentyl-pentacyclo[9.5.1.13,91.5,151.7,13]octasiloxane-1-yl0 propyl methacrylate, Polymer Source, Inc.) having an average particle diameter of 6 nm and represented by Formula 4a was prepared as an organic-inorganic silicon structure-containing block copolymer.

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture.

N-butyl-N31 methylpyrrolidinium bis 3-trifluoromethanesulfonyl)imide (PYR14TFSI, ≥98% HLPC grade, number average molecular weight (Mn)=422.41 Da, C-TRI), as an ionic liquid, 18% by weight of poly(ethylene glycol) dimethyl ether (PEGDME, ≥99% HPLC grade, number average molecular weight (Mn)=250 Da, Sigma Aldrich Corporation), as an oligomer, and 5% by weight of Si having an average particle diameter of 7 nm were added to the mixture. In this regard, the ionic liquid/lithium ion (IL/Li) molar ratio was 0.8.

3% by weight of the organic-inorganic silicon structure-containing block copolymer powder represented by Formula 4a based on a total weight of the polymer matrix was added to the mixture, and the resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Comparative Example 1

Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture. The resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Comparative Example 2

Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture. 5% by weight of Si having an average particle diameter of 7 nm was added to the mixture, and the resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Comparative Example 3

Preparation of Electrolyte

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Lithium trifluoromethanesulfonimide (LiTFSI) powder was added to and dissolved in the polymer matrix solution such that an ethylene oxide/lithium ion (EO/Li) molar ratio was 20 to prepare a mixture. 2% by weight of polyhedral oligomeric silsesquioxane (POSS, manufactured by Gelest, Inc.) based on a total weight of the polymer matrix was added to the mixture, and the resultant mixture was stirred at room temperature for 24 hours to prepare a slurry.

The slurry was cast on a Teflon dish. Tetrahydrofuran was slowly evaporated from the cast resultant in an argon glove box at about 25° C. for 24 hours and the cast resultant was dried in a vacuum at 60° C. for 24 hours to prepare an electrolyte in a layer form. In this regard, a thickness of the layer was 40 μm.

Reference Example 1

A polystyrene-b-poly(ethyleneoxide)-b-polystyrene (PS-b-PEO-b-PS) block copolymer (10-36-10 kg/mol, Polymer Source, Inc., number average molecular weight Mn=56,000 Da) was dissolved in 5% by weight of anhydrous tetrahydrofuran (THF, ≥99%, Sigma Aldrich Corporation) to prepare a polymer matrix solution as a polymer matrix.

Reference Example 2

Powder of an organic-inorganic silicon structure-containing block copolymer (poly(ethylene oxide-b-POSS-isoBuMA, POSSisoBuMA=3-(3,5,7,9,11,13,15-heptacyclopentyl-pentacyclo[9.5.1.13,91.5,151.7,13]octasiloxane-1-yl) propyl methacrylate, Polymer Source, Inc.) having an average particle diameter of 6 nm and represented by Formula 3a was prepared.

Manufacture of Lithium Battery

Example 7

Manufacture of Lithium Battery

The slurry used to prepare the electrode according to Example 1 was coated on a lithium metal negative electrode having a thickness of 20 μm by bar coating to a thickness of 8 μm, as a protective layer, instead of casting the slurry on the Teflon dish. The coated lithium metal negative electrode was dried at room temperature, and then further dried in a vacuum at 40° C. to prepare a negative electrode.

LiCoO$_2$ powder and a carbon conductive material (denka black) were mixed and a pyrrolidone solution including a polyvinylidene fluoride (PVdF) binder was added thereto to prepare a slurry such that a weight ratio of the active material:carbon conductive material:binder was 97.45:1.5:1.5.

The slurry was coated on a 15 μm-thick Al foil by bar coating to a thickness of about 40 to about 50 μm and dried. The dried slurry was further dried in a vacuum at 120° C. to prepare a positive electrode.

Coin cells having diameters of 16 mm and 12 mm were prepared using the negative electrode and the positive electrode. 0.8 molar (M) LiPF$_6$, as a lithium salt, dissolved in a mixed solvent of N-butyl-N31methylpyrrolidinium bis (3-trifluoromethanesulfonyl)imide (PYR14TFSI, ≥98% HLPC grade, number average molecular weight (Mn)=422.41 Da, C-TRI) and fluoroethylene carbonate (FEC) in a volume ratio of 8:2 was used as an electrolyte.

Comparative Example 4

Manufacture of Lithium Battery

Coin cells were prepared in the same manner as in Example 7, except that the slurry used to prepare the electrode according to Comparative Example 1, instead of the slurry used to prepare the electrolyte according to Example 1, was coated on a lithium metal negative electrode having a thickness of 20 μm by bar coating to a thickness of 8 μm, as a protective layer.

Comparative Example 5

Manufacture of Lithium Battery

Coin cells were prepared in the same manner as in Example 7, except that the slurry used to prepare the electrode according to Comparative Example 2, instead of the slurry used to prepare the electrolyte according to Example 1, was coated on a lithium metal negative electrode having a thickness of 20 μm by bar coating to a thickness of 8 μm, as a protective layer.

Comparative Example 6

Manufacture of Lithium Battery

Coin cells were prepared in the same manner as in Example 7, except that the slurry used to prepare the electrode according to Comparative Example 3, instead of the slurry used to prepare the electrolyte according to Example 1, was coated on a lithium metal negative electrode having a thickness of 20 μm by bar coating to a thickness of 8 μm, as a protective layer.

Analysis Example 1

Structural Analysis of Electrolyte—X-Ray Diffraction (XRD) Analysis

X-ray diffraction (XRD) tests were performed on the electrolytes according to Examples 1 and 3 and Comparative Example 1, the polymer matrix solution according to Reference Example 1, and the organic-inorganic silicon structure-containing block copolymer according to Reference Example 2 to analyze structures thereof. The results are shown in FIGS. 4A to 4E.

Figure 4A:
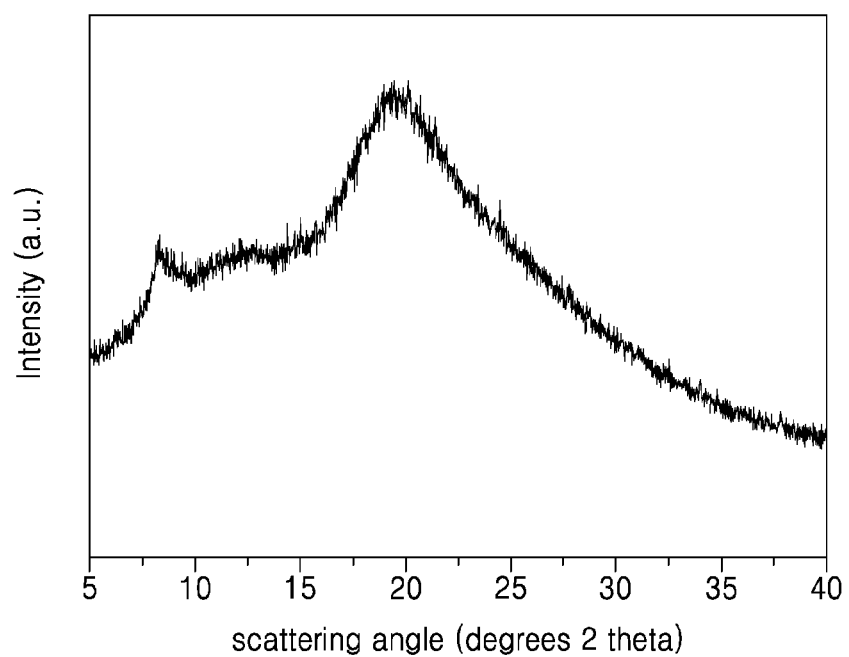
FIGS. 4A to 4E are graphs of intensity (arbitrary units, a. u.) versus scattering angle (degrees 2 theta) illustrating X-ray diffraction (XRD) results of electrolytes according to Examples 1 and 3 and Comparative Example 1, a polymer matrix solution according to Reference Example 1, and an organic-inorganic silicon structure-containing block copolymer according to Reference Example 2.
Figure 4B:
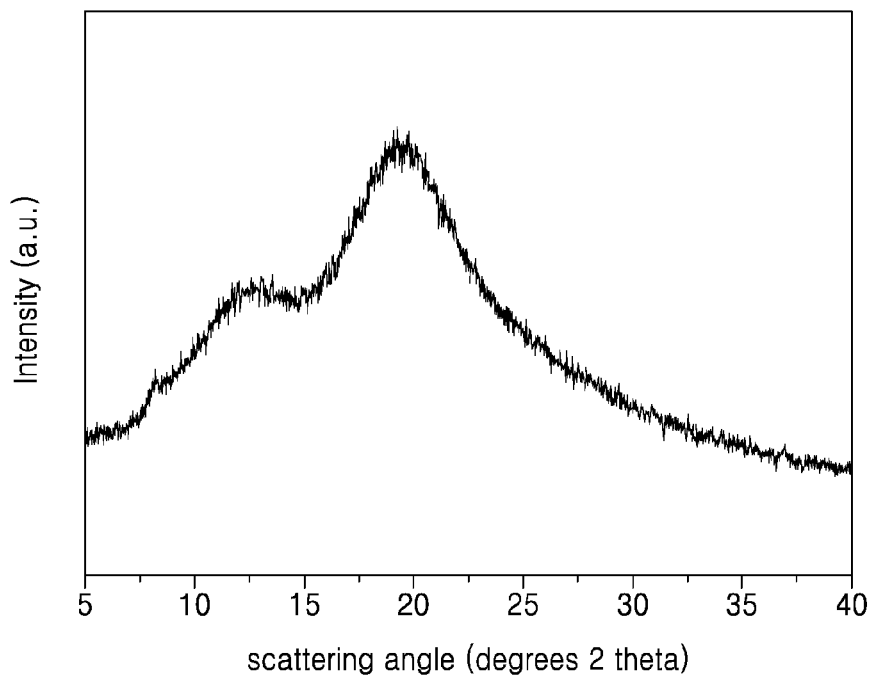
Figure 4C:
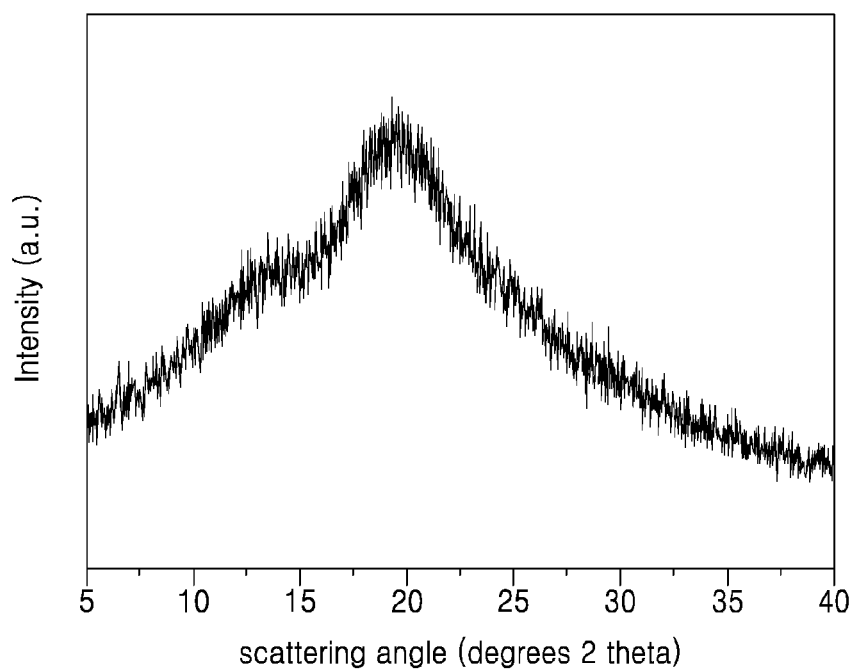
Figure 4D:
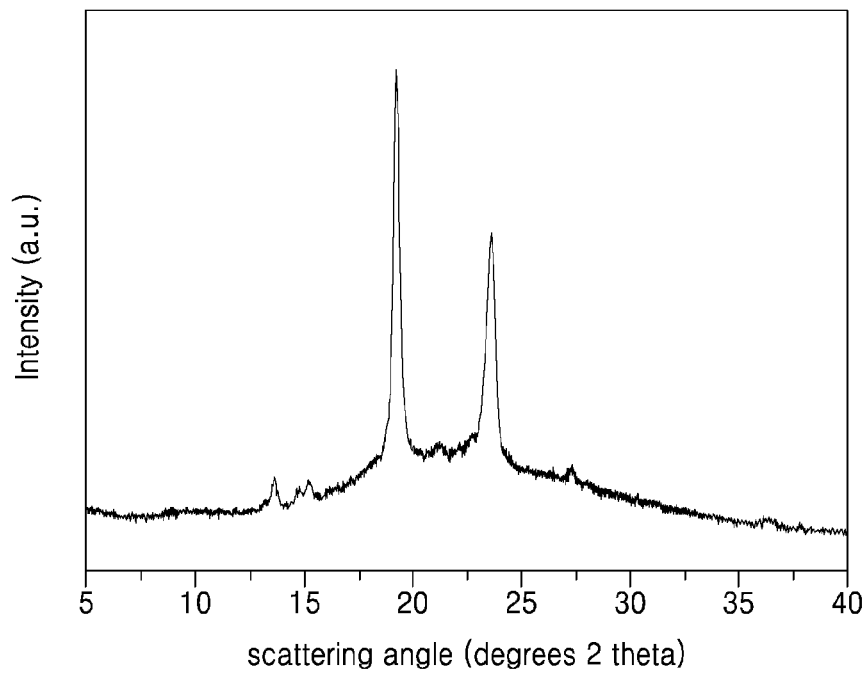
Figure 4E:
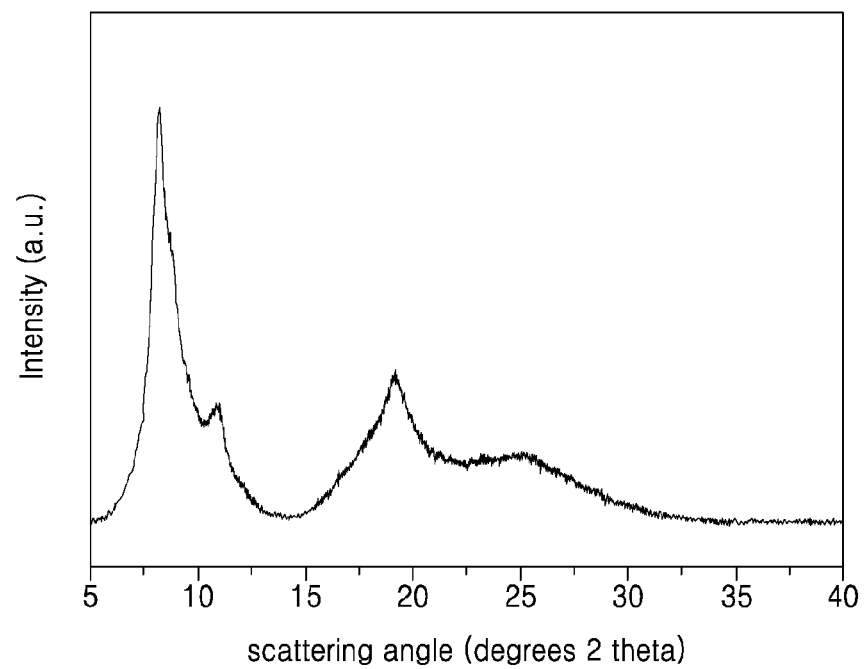
Figure 5A:
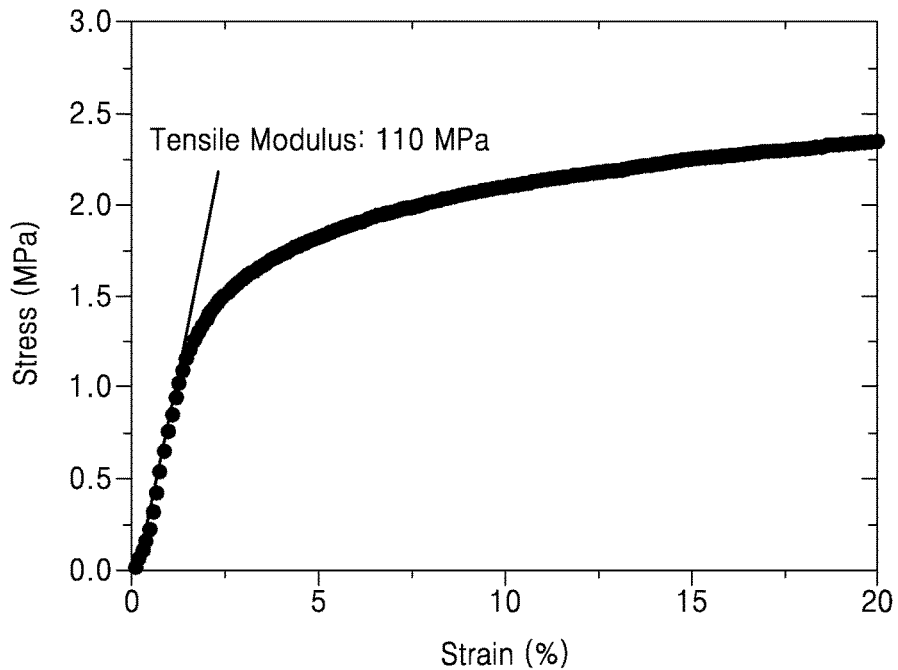
FIGS. 5A to 5E are graphs of stress (megapascals, MPa) versus percent strain (%) illustrating mechanical properties of electrolytes according to Examples 1 and 2, and Comparative Examples 1, 2, and 3, obtained by measuring tensile strength of the electrolytes.
Figure 5B:
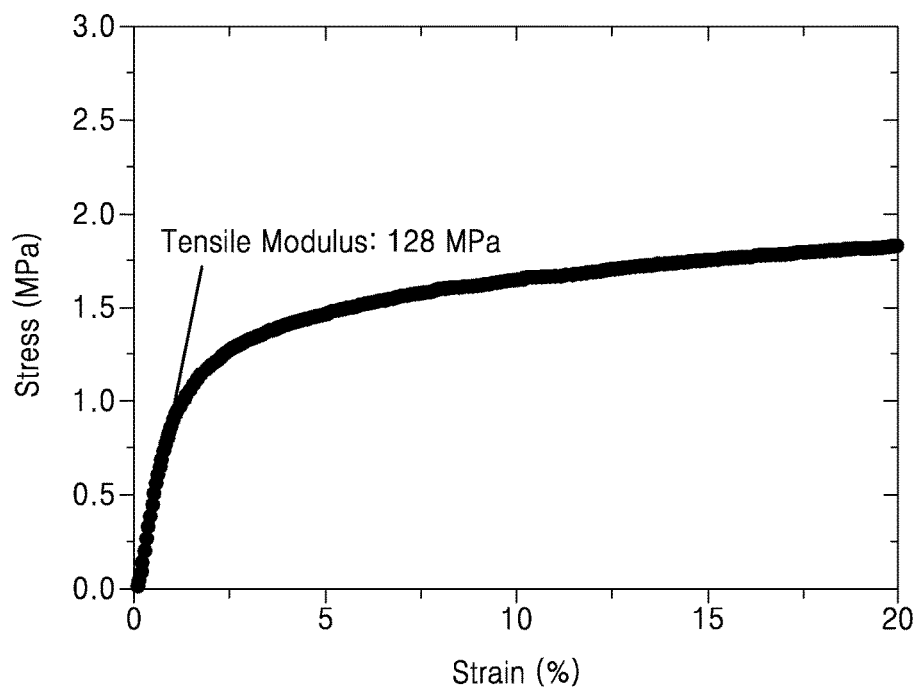
Figure 5C:
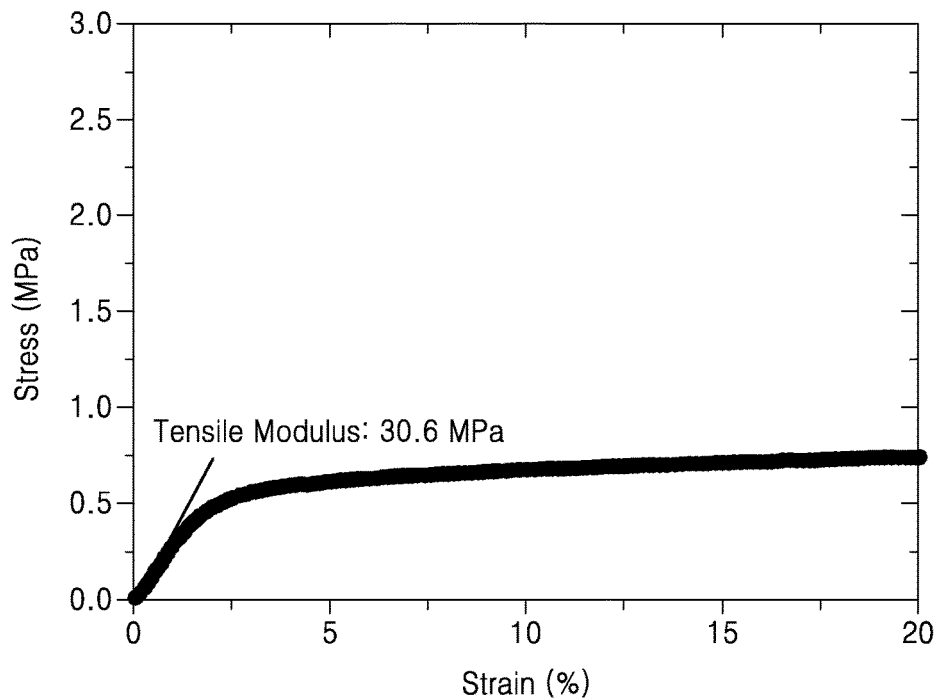
Figure 5D:
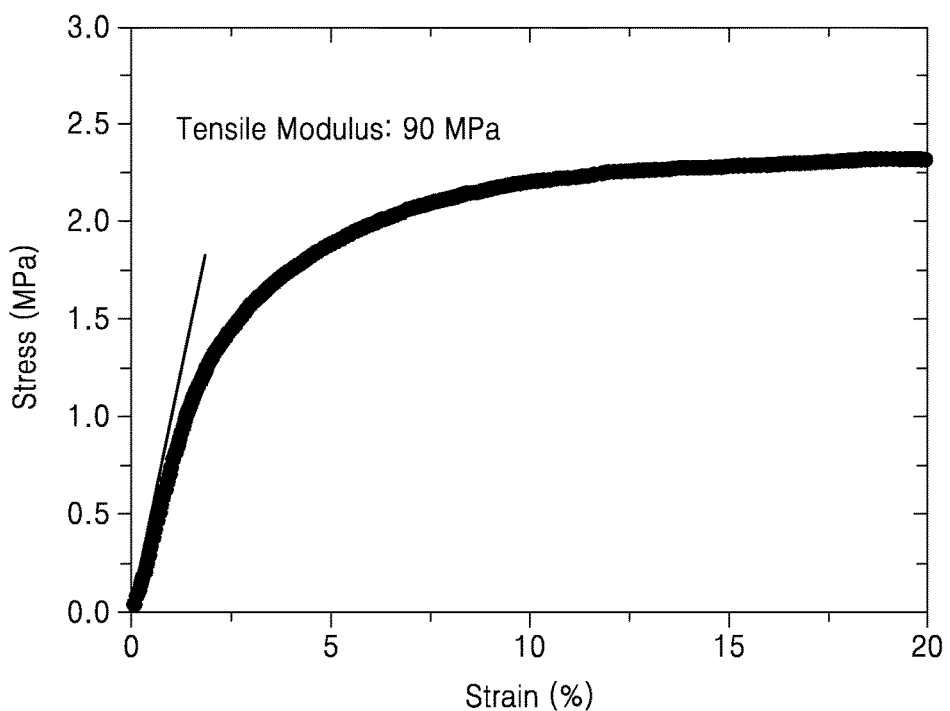
Figure 5E:
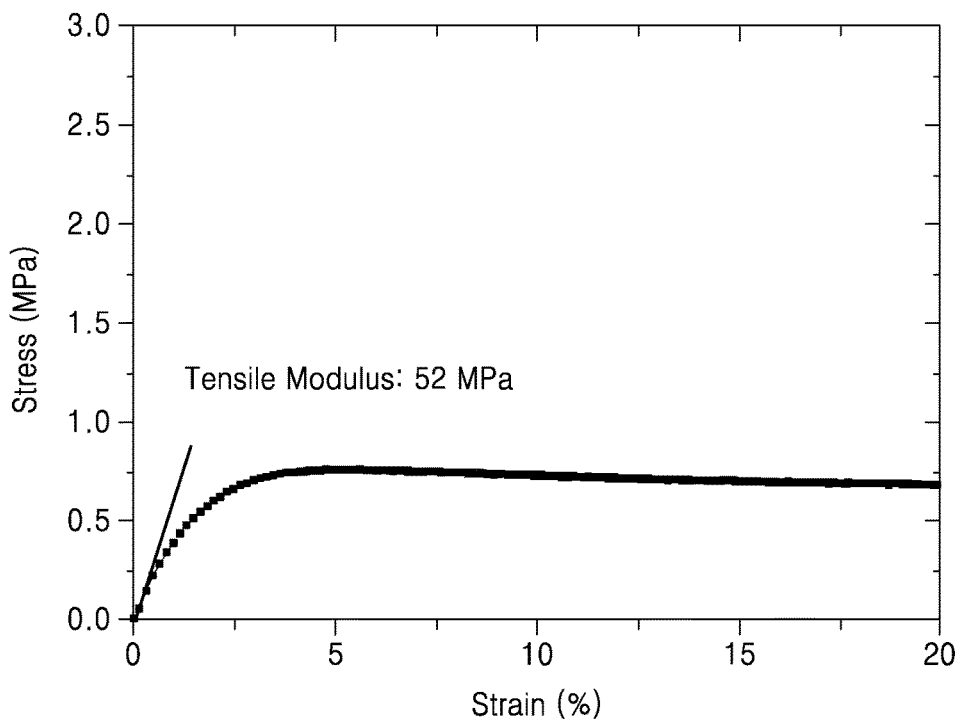

First, referring to FIGS. 4D and 4E, it was confirmed that a peak was shown at a Bragg (2θ) angle of about 8° in the XRD spectrum of the organic-inorganic silicon structure-containing block copolymer according to Reference Example 2 shown in FIG. 4E, which was different from that of the polymer matrix solution according to Reference Example 1 shown in FIG. 4D.

Referring to FIGS. 4A to 4C, while peaks were shown at a Bragg (2θ) angle of about 8° in the XRD spectra of the electrolytes according to Examples 1 and 3, no peak was observed at a Bragg (2θ) angle of about 8° in the XRD spectrum of the electrolyte according to Comparative Example 1. Thus, it was confirmed that the electrolytes according to Examples 1 and 3 include the organic-inorganic silicon structure-containing block copolymer according to Reference Example 2.

Evaluation Example 1

Evaluation of Ion Conductivity and Lithium Ion Mobility

Evaluation Example 1-1

Evaluation of Ion Conductivity

Cells were prepared by forming shielding electrodes on both surfaces of each of the electrolytes prepared according to Example 2 and Comparative Examples 1 and 3 by using stainless steel (SUS). Alternating current (AC) impedance of each sample on which the electrodes are formed was measured using a Solatron SI1260 impedance/gain-phase analyzer by using a 4-probe method. A frequency range was about 0.1 Hertz (Hz) to about 1 MHz, and an amplitude voltage was 10 millivolts (mV). The AC impedance was measured under atmospheric conditions at 25° C. Resistance was calculated from an arc of a Nyquist plot with respect to measurements of impedance, and ion conductivity was calculated by using Equation 1 below. The results are shown in Table 1 below.

$$\sigma = l/R \cdot A \quad \text{Equation 1}$$

wherein, in Equation 1,
$\alpha$ is ion conductivity,
R is resistance,
l is thickness of electrolyte layer, and
A is area of electrode
In this case, A is 1.13 square centimeters (cm²) and l is 40 µm.

TABLE 1

| Example | Ion conductivity (S/cm) |
| --- | --- |
| Example 2 | $3.56 \times 10^{-6}$ |
| Comparative Example 1 | $1.25 \times 10^{-6}$ |
| Comparative Example 3 | $0.95 \times 10^{-6}$ |

Referring to Table 1, ion conductivity of the electrolyte according to Example 2 was two to four times greater than ion conductivity of the electrolytes according to Comparative Examples 1 and 3 at 25° C.

Evaluation Example 1-2

Evaluation of Lithium Ion Mobility

Lithium ion mobility of the electrolytes prepared according to Example 2 and Comparative Example 1 was calculated using ion conductivity at 60° C., direct current (DC) polarization, and AC impedance of the electrolytes according to Example 2 and Comparative Example 1 through Equation 2-1, particularly, Equation 2-2 below. The results are shown in Table 2 below.

$$t_{Li}^{+} = t_{cation}/(t_{cation} + t_{anion}) \quad \text{Equation 2-1}$$

In Equation 2-1, the "$(t_{cation}+t_{anion})$" refers to a sum of the numbers of cations and anions contained in the electrolyte, and the "$t_{cation}$" refers to the number of cations contained in the electrolyte.

$$t_{Li^{+}} = \frac{i_{ss}(\Delta V - i_0 R^0)}{i_0(\Delta V - i_{ss} R^{ss})} \quad \text{Equation 2-2}$$

In Equation 2-2,
$t_{Li}^{+}$ is lithium ion mobility,
$i_0$ is initial current,
$i_{ss}$ is final current,
$R^0$ is cell resistance before the polarization, and
$R^{ss}$ is cell resistance after the polarization.
$\Delta V=10$ mV was substituted into Equation 2-2.
In this case, $i_0$ of Example 2 is $4.24 \times 10^{-4}$ A and $i_{ss}$ of Example 2 is $1.42 \times 10^{-5}$ A, and $i_0$ of Comparative Example 2 is $2.37 \times 10^{-4}$ A and $i_{ss}$ of Comparative Example 2 is $9.94 \times 10^{-5}$ A.

TABLE 2

| Example | Lithium ion mobility |
| --- | --- |
| Example 2 | 0.165 |
| Comparative Example 1 | 0.132 |

Referring to Table 2, it is confirmed that lithium ion mobility of the electrolyte according to Example 2 is greater than lithium ion mobility of the electrolyte according to Comparative Example 1. That is, it may be considered that the electrolyte according to Example 2 has more stable lithium ion mobility.

Evaluation Example 2

Evaluation of Mechanical Properties

Mechanical properties of the electrolytes according to Examples 1 and 2 and Comparative Examples 1 to 3 were evaluated using a DMA800 testing machine manufactured by TA Instruments. Experiments were performed under atmospheric conditions at 25° C. Samples had a width of 0.5 centimeters (cm), a length of 40 cm, and a thickness of 40 µm. Elongation was 1.2 millimeters per minute (mm/min). The results are shown in Table 3 below, FIGS. 5A to 5E.

TABLE 3

| Example | Young's Modulus (MPa) |
| --- | --- |
| Example 1 | 110 |
| Example 2 | 128 |
| Comparative Example 1 | 30.6 |
| Comparative Example 2 | 90 |
| Comparative Example 3 | 52 |

Referring to Table 3 and FIGS. 5A to 5E, Tensile Moduli of the electrolytes according to Examples 1 and 2 were greater than those of the electrolyte according to Comparative Examples 1 to 3.

Evaluation Example 3

Evaluation of Electrochemical Stability

Figure 6A:
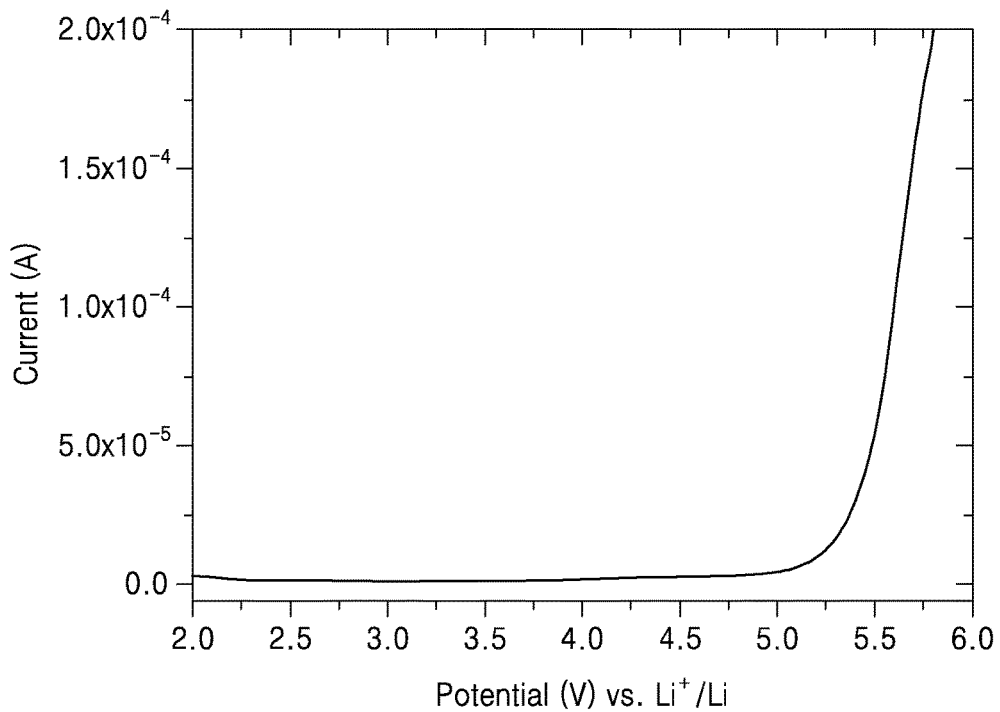
FIGS. 6A and 6B are graphs of current (amperes, A) versus potential versus $Li^+/Li$ (volts, V) illustrating electrochemical stability of lithium batteries including electrolytes according to Example 1 and Comparative Example 1, evaluated by linear sweep voltammetry (LSV) at 60° C.
Figure 6B:
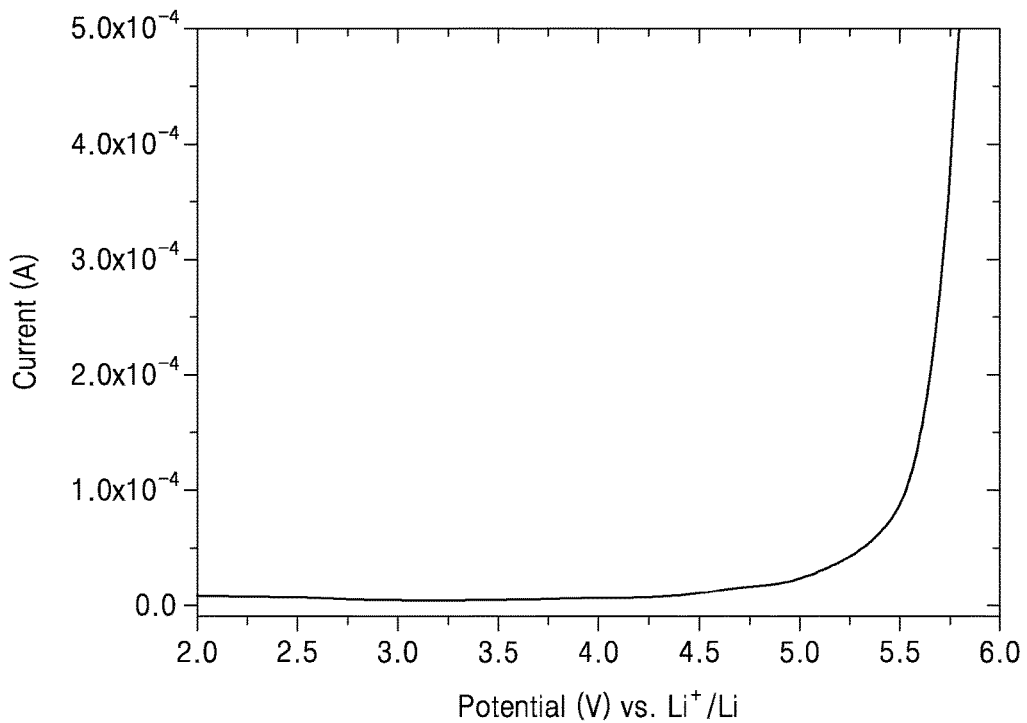

Cells were prepared by forming shielding electrodes on both surfaces of each of the electrolytes prepared according to Example 1 and Comparative Example 1 by using Li/electrolyte/SUS electrodes. Electrochemical stability of the cells was evaluated by linear sweep voltammetry (LSV). The results are shown in FIGS. 6A and 6B. Conditions for LSV include a voltage of about 0 V to about 6 V and a scan rate of about 1 millivolts per second (mV/s) at 60° C.

Referring to FIGS. 6A and 6B, while a cell including the electrolyte according to Example 1 was stable up to about 4.75 V with respect to Li⁺/Li, a cell including the electrolyte according to Comparative Example 1 was stable up to about 4.25 V with respect to Li⁺/Li. Thus, it may be confirmed that the cell including the electrolyte according to Example 1 has better electrochemical stability than the cell including the electrolyte according to Comparative Example 1.

Evaluation Example 4

Evaluation of Lifespan Characteristics

Lifespan characteristics of the lithium batteries according to Example 7, and Comparative Examples 4 and 5 were evaluated.

Evaluation of lifespan characteristics was performed by charging the lithium batteries at a rate of 0.05 coulombs (C) at room temperature until the voltage reached 4.3 V and discharging at a rate of 0.05 C in a constant current mode of 0.18 milliamperes (mA) until the voltage reached a cut-off voltage of 3 V. Charge capacity and discharge capacity (charge capacity and discharge capacity at $1^{st}$ cycle) were measured. Charging and discharging were repeated as described above 10 times and discharge capacities were measured at each cycle. Lifespan characteristics were evaluated by calculating capacity retention rates (%) through Equation 3 below. The results are shown in Table 4 below and FIG. 7.

$$\text{Capacity retention rate (\%)} = [\text{discharge capacity at } 10^{th} \text{ cycle/discharge capacity at } 1^{st} \text{ cycle}] \times 100 \quad \text{Equation 3}$$

TABLE 4

| Example | Discharge capacity at $1^{st}$ cycle | Discharge capacity at $10^{th}$ cycle | Capacity retention rate (%) |
|---|---|---|---|
| Example 7 | 149.6 | 144.7 | 96.7 |
| Comparative Example 4 | 147.8 | 133.6 | 90.4 |
| Comparative Example 5 | 73.1 | 40.01 | 54.7 |

Figure 7:
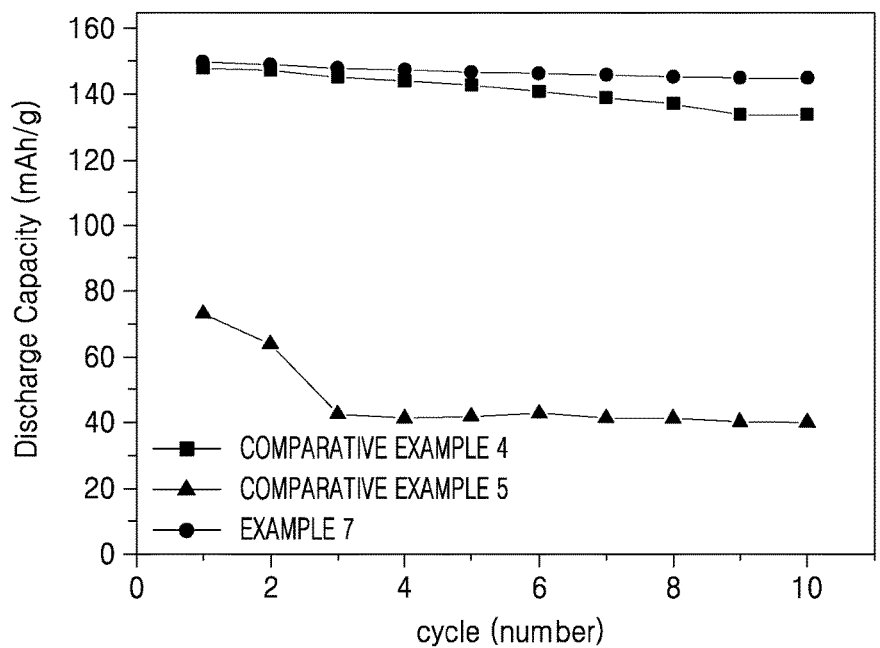
FIG. 7 is a graph of discharge capacity (milliampere-hours per gram, mAh/g) illustrating lifespan characteristics of lithium batteries including electrolytes according to Example 1 and Comparative Examples 4 and 5, measured at a rate of 0.05 coulombs (C) in a constant current mode of 0.18 milliamperes (mA) at 25° C.

Referring to Table 4 and FIG. 7, the capacity retention rate of the lithium battery according to Example 7 was greater than those of the lithium batteries according to Comparative Examples 4 and 5. Thus, it may be confirmed that lifespan characteristics of the lithium battery according to Example 7 are enhanced compared with the lithium batteries according to Comparative Examples 4 and 5.

As described above, according to the one or more of the above exemplary embodiments, the organic-inorganic silicon structure-containing block copolymer may have high ion conductivity, high lithium ion mobility, and excellent mechanical properties at room temperature, and the electrolyte and the lithium battery including the organic-inorganic silicon structure-containing block copolymer may have high electrochemical stability and excellent lifespan characteristics.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present disclosure as defined by the following claims.

What is claimed is:

1. An organic-inorganic silicon structure-containing block copolymer represented by at least one selected from Formulae 3 to 5:

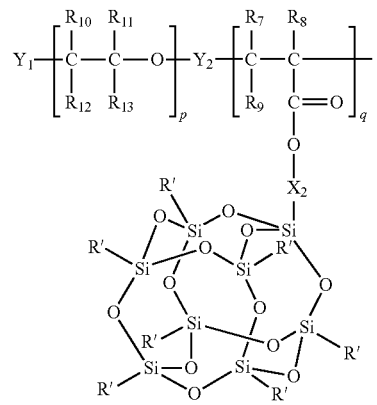

Formula 3 wherein, in Formula 3, p is from 2 to 25 and q is from 2 to 25,

R' is at least one selected from a hydrogen atom, a hydroxyl group, a vinyl ether group, a substituted or unsubstituted C1-C20 alkyl group, a substituted or unsubstituted ethylene oxide group, a substituted or unsubstituted acrylate group, a substituted or unsubstituted methacrylate group, a substituted or unsubstituted glycidyl ether group, a substituted or unsubstituted epoxy group, and a substituted or unsubstituted oxetane group, $R_7$, $R_8$, $R_9$, $R_{10}$, $R_{11}$, $R_{12}$, and $R_{13}$ are each independently at least one selected from a hydrogen atom, a halogen atom, a substituted or unsubstituted C1-C20 alkyl group, and a substituted or unsubstituted C1-C20 alkoxy group, $X_2$ is a substituted or unsubstituted C1-C20 alkylene group or a substituted or unsubstituted C1-C20 heteroalkylene group, $Y_1$ is at least one selected from a hydrogen atom, a halogen atom, a substituted or unsubstituted C1-C20 alkyl group, and a substituted or unsubstituted C1-C20 alkoxy group, and $Y_2$ is at least one selected from a single bond, a substituted or unsubstituted C1-C20 alkylene group, a substituted or unsubstituted C1-C20 heteroalkylene group, a substituted or unsubstituted C1-C20 sulfonylalkylene group, and a substituted or unsubstituted C1-C20 carbonylalkylene group;

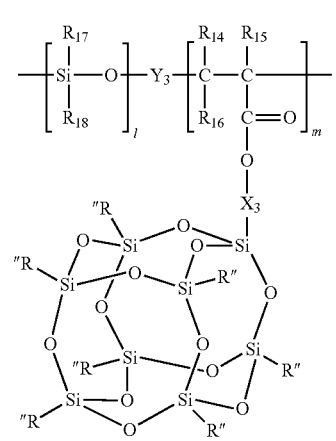

Formula 4 wherein, in Formula 4,
l is from 2 to 25 and m is from 2 to 25,
R" is at least one selected from a hydrogen atom, a hydroxyl group, a vinyl ether group, a substituted or unsubstituted C1-C20 alkyl group, a substituted or unsubstituted ethylene oxide group, a substituted or unsubstituted acrylate group, a substituted or unsubstituted methacrylate group, a substituted or unsubstituted glycidyl ether group, a substituted or unsubstituted epoxy group, and a substituted or unsubstituted oxetane group, $R_{14}$, $R_{15}$, $R_{16}$, $R_{17}$, and $R_{18}$ are each independently at least one selected from a hydrogen atom, a halogen atom, a substituted or unsubstituted C1-C20 alkyl group, and a substituted or unsubstituted C1-C20 alkoxy group, $X_3$ is a substituted or unsubstituted C1-C20 alkylene group or a substituted or unsubstituted C1-C20 heteroalkylene group, and $Y_3$ is at least one selected from a single bond, a substituted or unsubstituted C1-C20 alkylene group, a substituted or unsubstituted C1-C20 heteroalkylene group, a substituted or unsubstituted C1-C20 sulfonylalkylene group, a substituted or unsubstituted C1-C20 carbonylalkylene group, and a group of formula

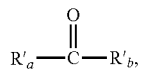

wherein $R'_a$ and $R'b$ are each independently a substituted or unsubstituted C1-C20 alkylene group or a substituted or unsubstituted C1-C20 heteroalkylene group;

Formula 5

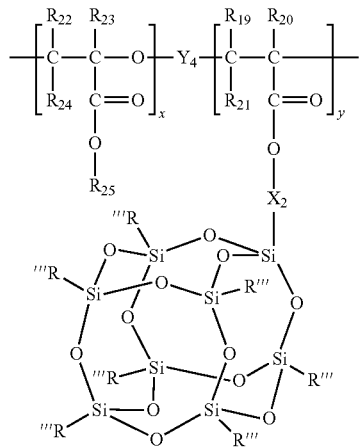

wherein, in Formula 5,
x is from 2 to 25 and y is from 2 to 25,
R'" is at least one selected from a hydrogen atom, a hydroxyl group, a vinyl ether group, a substituted or unsubstituted C1-C20 alkyl group, a substituted or unsubstituted ethylene oxide group, a substituted or unsubstituted acrylate group, a substituted or unsubstituted methacrylate group, a substituted or unsubstituted glycidyl ether group, a substituted or unsubstituted epoxy group, and a substituted or unsubstituted oxetane group, $R_{19}$, $R_{20}$, $R_{21}$, $R_{22}$, $R_{23}$, $R_{24}$, and $R_{25}$ are each independently at least one selected from a hydrogen atom, a halogen atom, a substituted or unsubstituted C1-C20 alkyl group, and a substituted or unsubstituted C1-C20 alkoxy group, $X_4$ is a substituted or unsubstituted C1-C20 alkylene group or a substituted or unsubstituted C1-C20 heteroalkylene group, and $Y_4$ is at least one selected from a single bond, a substituted or unsubstituted C1-C20 alkylene group, a substituted or unsubstituted C1-C20 heteroalkylene group, a substituted or unsubstituted C1-C20 sulfonylalkylene group, and a substituted or unsubstituted C1-C20 carbonylalkylene group.

2. The organic-inorganic silicon structure-containing block copolymer of claim 1, wherein the organic-inorganic silicon structure-containing block copolymer comprises at least one selected from a diblock copolymer and a triblock copolymer.

3. An electrolyte comprising:
a polymer matrix;
the organic-inorganic silicon structure-containing block copolymer according to claim 1, and
a lithium salt.

4. The electrolyte of claim 3, wherein the polymer matrix comprises at least one selected from a homopolymer and a block copolymer.

5. The electrolyte of claim 4, wherein the homopolymer comprises at least one selected from a polyethylene oxide, polymethylmethacrylate, polystyrene, polyacrylonitrile, and polyvinylidene fluoride.

6. The electrolyte of claim 4, wherein the block copolymer comprises:
a third domain comprising an ion conductive polymer block; and
a fourth domain covalently linked to the third domain,
wherein the fourth domain comprises a non-conducting polymer block.

7. The electrolyte of claim 3, wherein an amount of the organic-inorganic silicon structure in the organic-inorganic silicon structure-containing block copolymer is in a range of about 2 percent by weight to about 10 percent by weight based on a total weight of the polymer matrix.

8. The electrolyte of claim 3, wherein the electrolyte further comprises at least one selected from an organic solvent, an ionic liquid, an oligomer, and an inorganic particle.

9. The electrolyte of claim 3, wherein the electrolyte is at least one selected from a gel phase layer and a solid phase layer.

10. A lithium battery comprising:
a positive electrode comprising a positive active material;
a negative electrode allowing intercalation and deintercalation of lithium ions; and
an electrolyte interposed between the positive electrode and the negative electrode,
wherein the electrolyte comprises the electrolyte according to claim 3.

11. The lithium battery of claim 10, wherein the negative electrode comprises at least one selected from a lithium metal and a lithium metal alloy.

12. The lithium battery of claim 10, further comprising a protective layer disposed on a portion of or the entire surface of the negative electrode, or separately disposed between the negative electrode and the electrolyte.

13. The lithium battery of claim 12, wherein the protective layer is formed as a single layer or multiple layers.

14. The lithium battery of claim 12, wherein the protective layer is at least one selected from a gel phase layer or solid phase layer.

* * * * *